(12) United States Patent
Whitling et al.

(10) Patent No.: US 8,934,601 B2
(45) Date of Patent: Jan. 13, 2015

(54) METHOD AND APPARATUS FOR A BWR CONTROL ROD HANDLING GRAPPLE

(75) Inventors: Robert W. Whitling, San Jose, CA (US); Michael Joseph Gundrum, Cincinnati, OH (US); Mark D. Bardeen, Wilmington, NC (US); Gregory A. Francisco, San Jose, CA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 924 days.

(21) Appl. No.: 13/249,848

(22) Filed: Sep. 30, 2011

(65) Prior Publication Data

US 2013/0082472 A1    Apr. 4, 2013

(51) Int. Cl.
*G21C 19/00*    (2006.01)
*B66C 1/42*    (2006.01)
*G21C 19/20*    (2006.01)

(52) U.S. Cl.
CPC ............. *B66C 1/425* (2013.01); *G21Y 2004/40* (2013.01); *G21C 19/207* (2013.01)
USPC ........................................................ 376/260

(58) Field of Classification Search
CPC ... G21C 19/207; G21Y 2004/40; Y02E 30/40
USPC ........................................................ 342/260
See application file for complete search history.

(56) References Cited

U.S. PATENT DOCUMENTS

| | | | |
|---|---|---|---|
| 5,164,151 A * | 11/1992 | Shah et al. | 376/260 |
| 5,331,675 A | 7/1994 | Hosoya et al. | |
| 5,377,239 A | 12/1994 | Nopwaskey et al. | |
| 5,473,645 A | 12/1995 | Kowdley | |
| 5,521,950 A | 5/1996 | Whitling | |
| 5,570,399 A | 10/1996 | Sakamaki | |
| 6,047,037 A | 4/2000 | Wivagg | |
| 6,081,573 A * | 6/2000 | Akimoto et al. | 376/263 |

(Continued)

FOREIGN PATENT DOCUMENTS

| | | |
|---|---|---|
| EP | 0626699 A1 | 11/1994 |
| JP | 07-072289 | 11/1994 |

(Continued)

OTHER PUBLICATIONS

An unofficial English translation of ES Office Action issued in connection with corresponding ES Patent Application No. 201231435 dated Dec. 18, 2013.
Sep. 24, 2014 Japanese Office Action issued in Japanese Patent Application 2012-209046.

* cited by examiner

*Primary Examiner* — Frank J McGue
(74) *Attorney, Agent, or Firm* — Harness, Dickey & Pierce, PLC

(57) ABSTRACT

A method and apparatus for grasping and lifting a boiling water reactor (BWR) control rod using a grapple. The grapple may grasp the control rod blade, the fuel support casting and the control rod guide tube of the control rod, to lift and move all three of these components in unison. The grapple includes a frame, a control rod blade hook, a fuel support casting hook(s) and a control rod guide tube hook(s). The control rod guide tube hook(s) may have a distal end that extends through a side flow orifice of a fuel support casting and beyond the confines of a control rod guide tube flow orifice to grasp the control rod guide tube. The distal end of the control rod guide tube hook(s) may include inner and outer landing surfaces, providing respective support for the fuel support casting and control rod guide tube.

22 Claims, 29 Drawing Sheets

(56) References Cited

U.S. PATENT DOCUMENTS

| | | |
|---|---|---|
| 6,295,329 B1 | 9/2001 | Maehara et al. |
| 6,501,813 B1 | 12/2002 | Soma et al. |
| 6,556,641 B2 | 4/2003 | Maehara et al. |
| 2002/0003850 A1 | 1/2002 | Maehara et al. |

FOREIGN PATENT DOCUMENTS

| | | |
|---|---|---|
| JP | 11-304987 | 11/1999 |
| JP | 2003-066194 | 3/2003 |

FIG. 4A
(Conventional Art)
FIG. 4B
(Conventional Art)
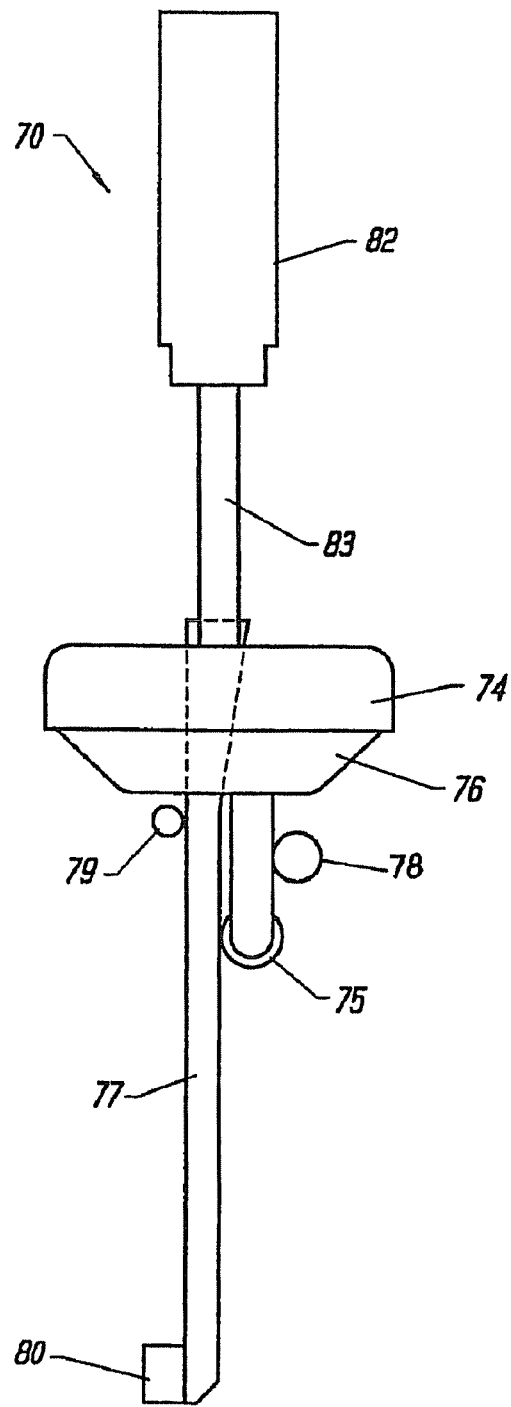
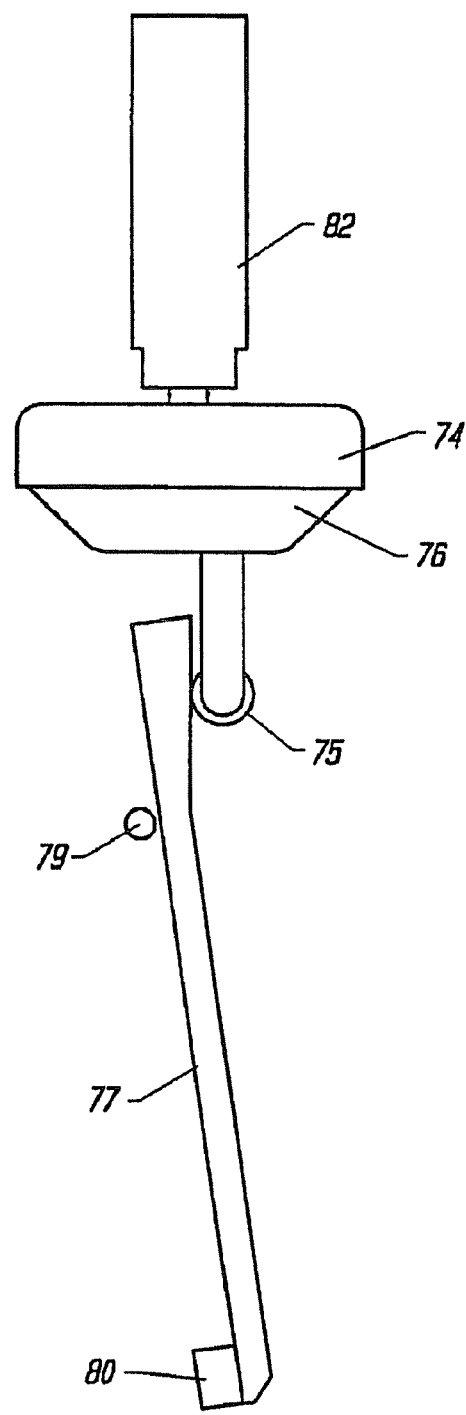

FIG. 6A
FIG. 6B
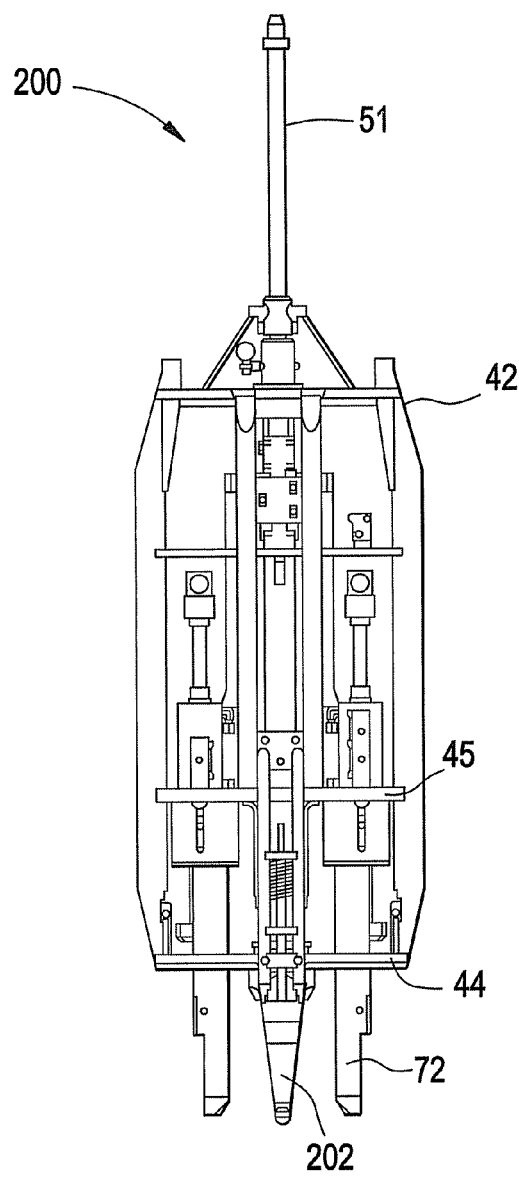
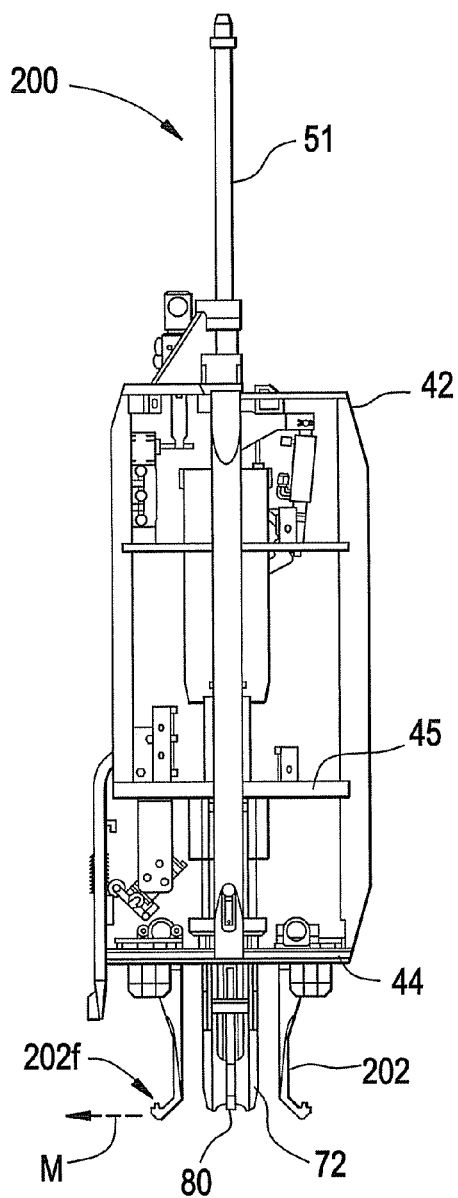

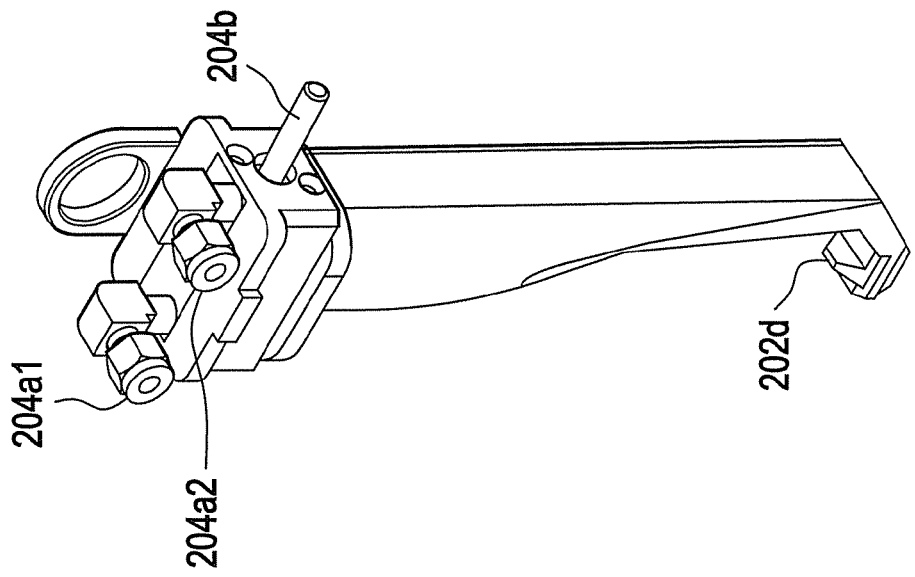
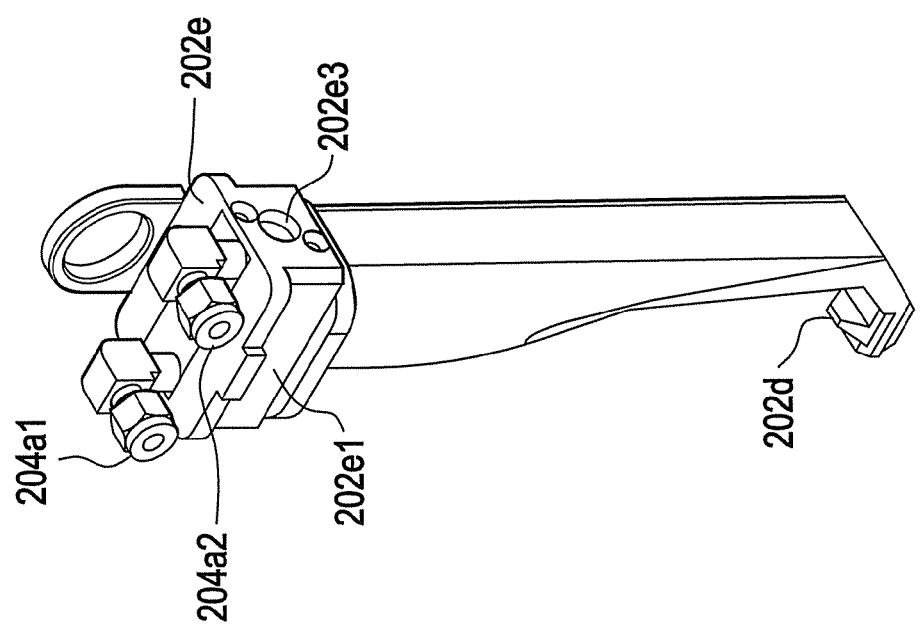

FIG. 12
(CONVENTIONAL ART)
FIG. 12A
(CONVENTIONAL ART)
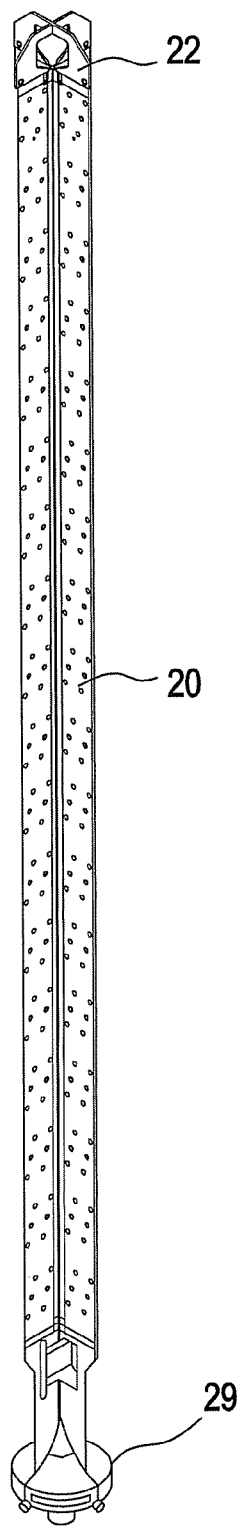
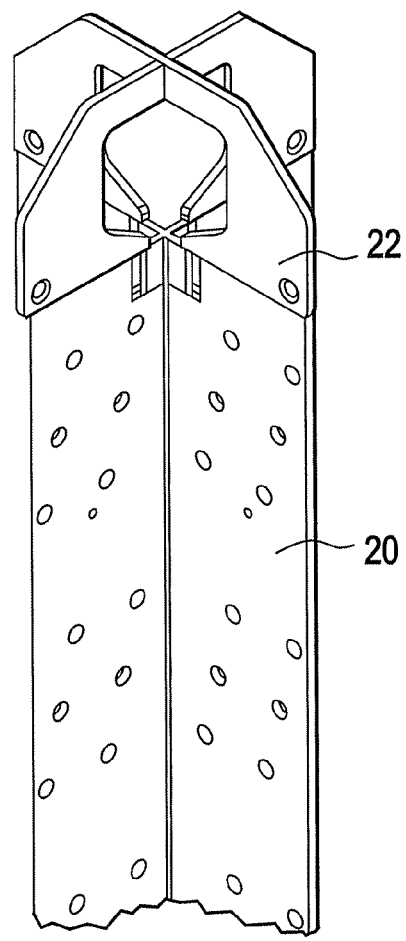

FIG. 13
(CONVENTIONAL ART)
FIG. 13A
(CONVENTIONAL ART)
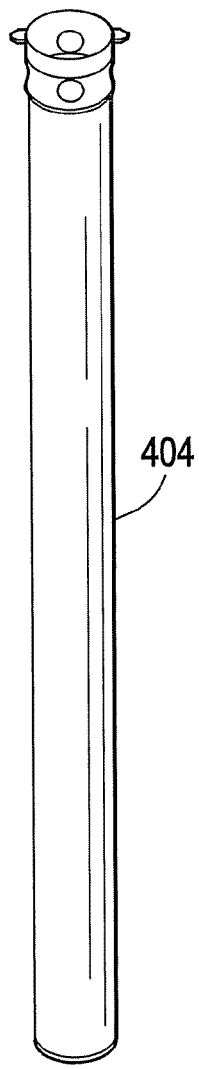
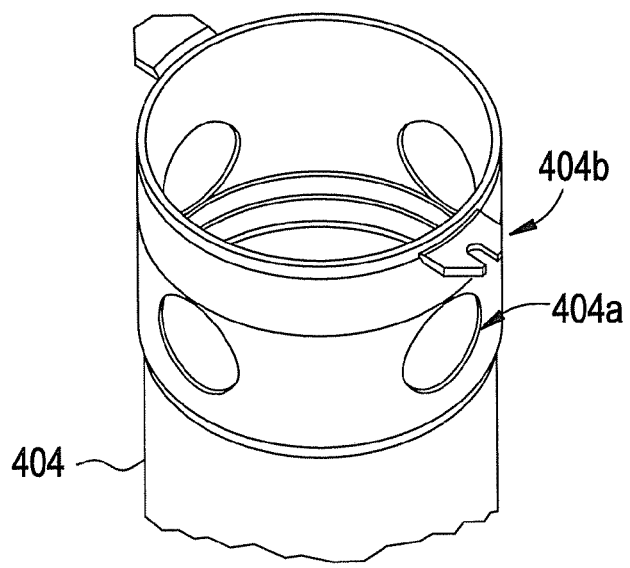

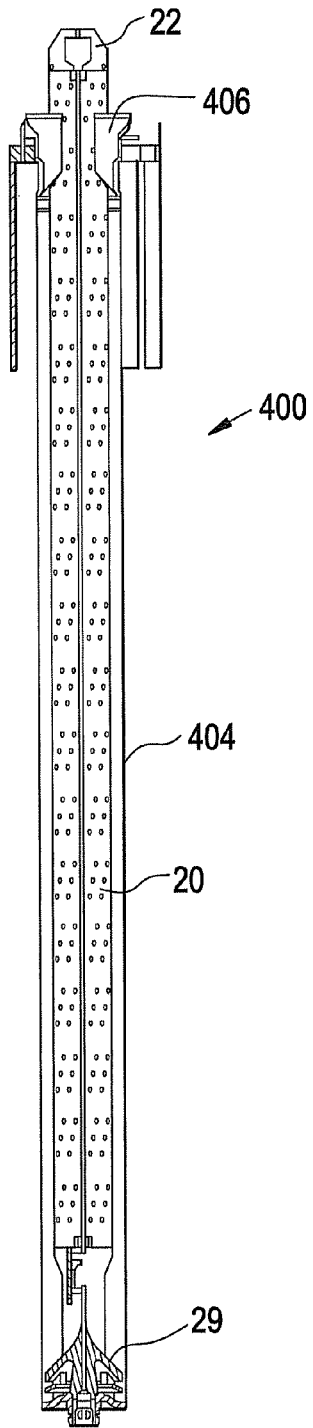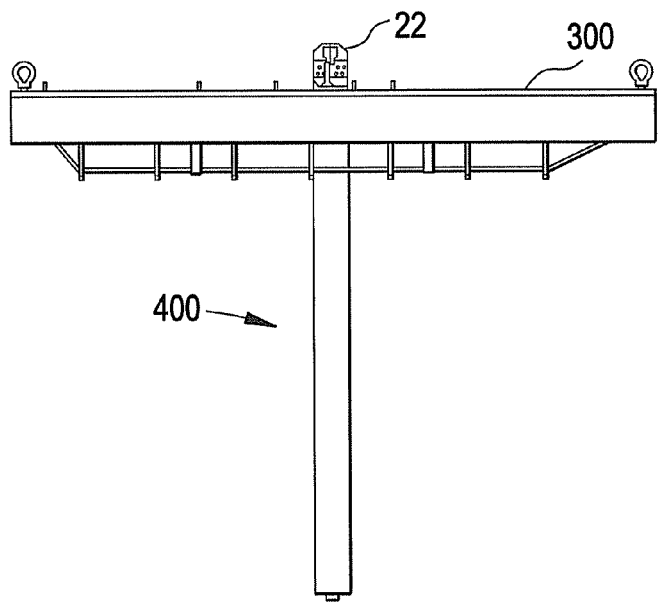
FIG. 15 (CONVENTIONAL ART)
FIG. 15A (CONVENTIONAL ART)

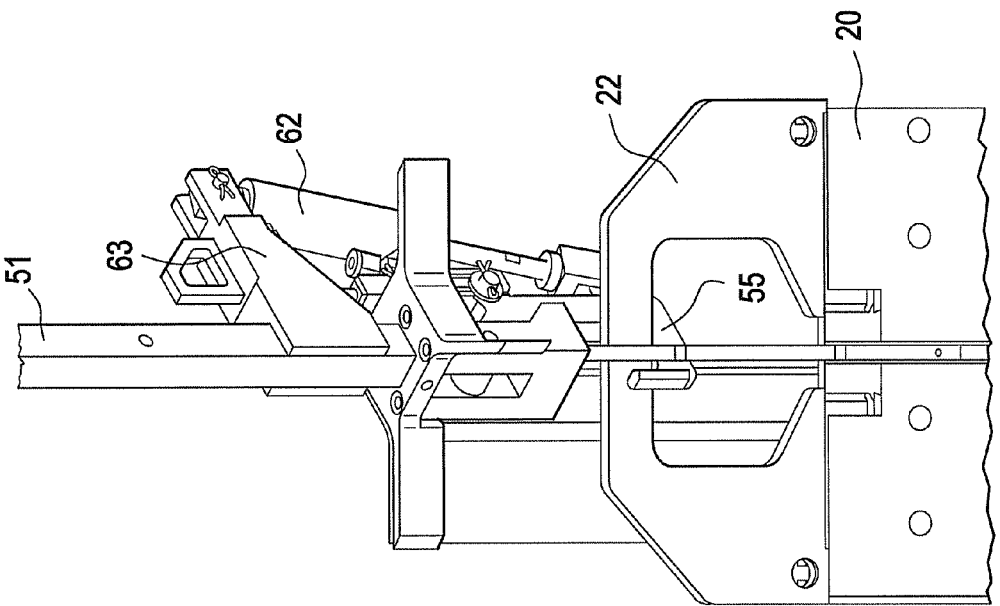
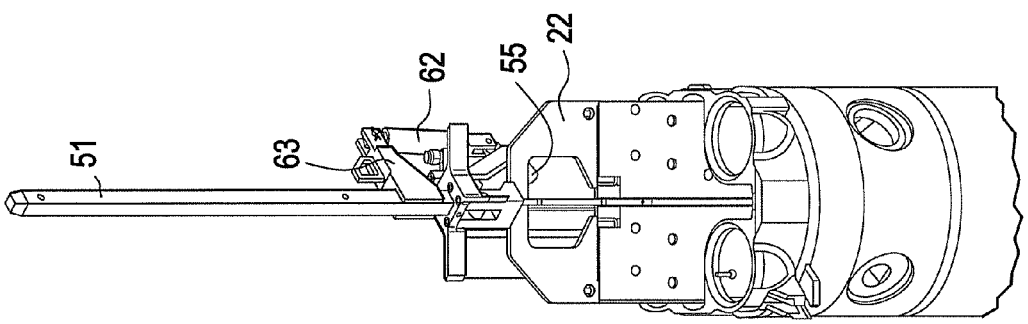

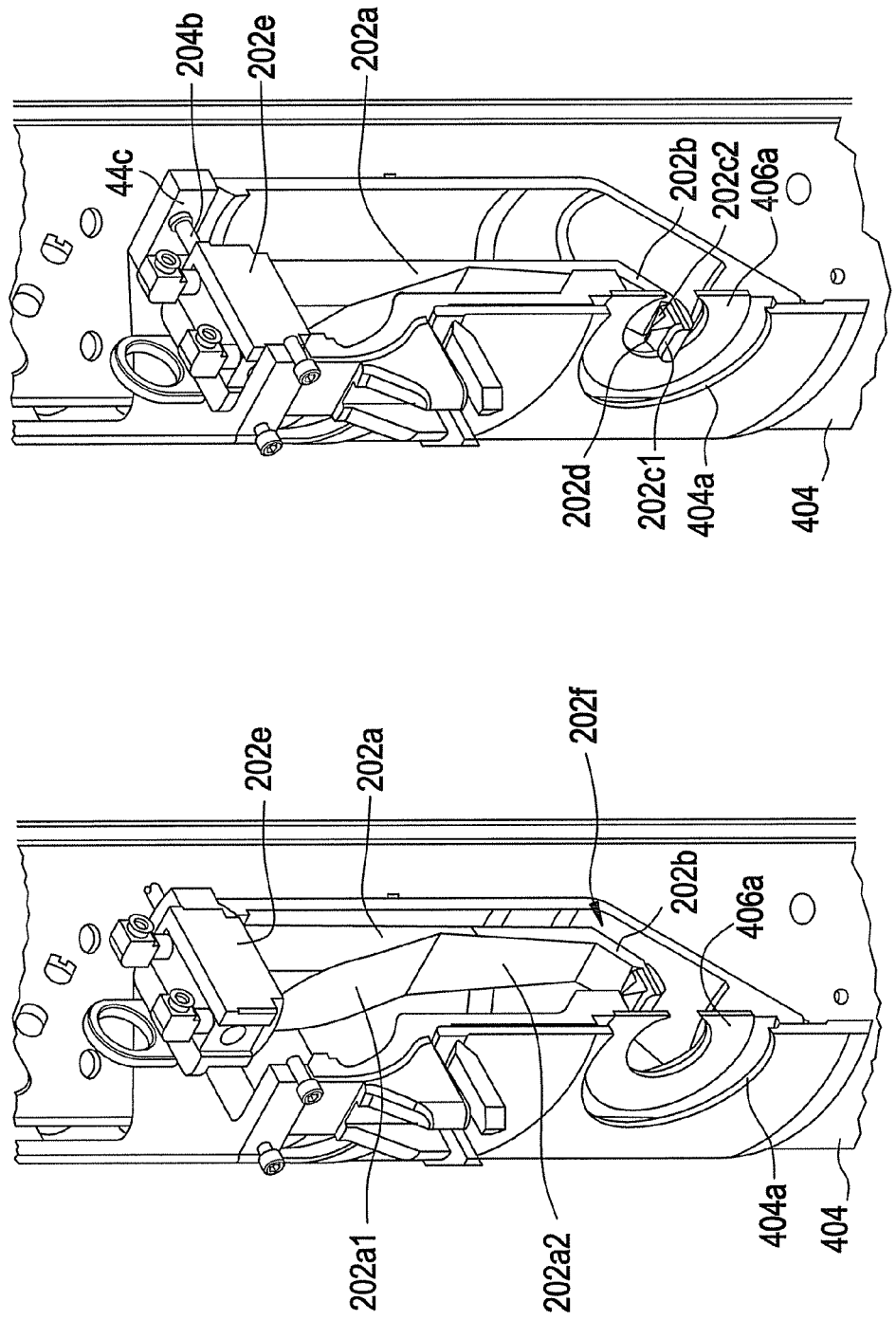

METHOD AND APPARATUS FOR A BWR CONTROL ROD HANDLING GRAPPLE

BACKGROUND OF THE INVENTION

1. Field of the Invention

Example embodiments relates to a grapple and a process for inserting, rearranging and/or removing control rods blades, fuel support castings and control rod guide tubes from fuel assemblies of a Boiling Water Reactor (BWR) nuclear core. The grapple may lift all three objects as a single unit during refueling operations and/or plant maintenance.

2. Related Art

The control rods in a boiling water reactor contain an absorbent material that when positioned in the reactor core can be used to slow the fission rate of the nuclear fuel. However, the absorbent material is subject to degradation after extended use. Therefore, it is periodically necessary to replace the control rods. Since different regions of the reactor core have different levels of irradiation fluence, in order to reduce expenses, it is common to periodically reposition the control rods within the core to maximize their useful life.

Conventionally, grapples have been used to grip the control rod blade and/or fuel support casting from the core. These grapples may remove the control rod blade and fuel support casting either individually, or in unison with each other. A separate grapple has conventionally been used to remove the control rod guide tube, adding time to the critical path during a refueling and maintenance outage.

SUMMARY OF INVENTION

Example embodiments provide a method and an apparatus for rearranging and/or replacing control rods in a boiling water reactor (BWR). Example embodiments provide a method and a grapple that may simultaneously remove the control blade, fuel support casting and control rod guide tube from the reactor, all in one movement.

The grapple may include a frame, control rod blade (CRB) hooks capable of gripping the bail handle of a control rod, opposing fuel support casting (FSC) hooks capable of grasping the fuel support casting, and opposing control rod guide tube (CRGT) hooks that may be pneumatically actuated to slide into control rod guide tube orifice holes to remove the guide tube in unison with the control rod and the fuel support casting.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 4A/4B are schematic drawings of a pivot bar portion of a fuel support casting (FSC) hook mechanism of the conventional grapple of FIG. 1;

FIG. 6A is a side view of the grapple of FIG. 6, in accordance with an example embodiment;

FIG. 6B is another side view of the grapple of FIG. 6, in accordance with an example embodiment;

FIG. 7E is a rear perspective view of the CRGT hook of FIG. 7, with the cylinder rod in a retracted position, in accordance with an example embodiment;

FIG. 7F is a another rear perspective view of the CRGT hook of FIG. 7, with the cylinder rod in an extended position, in accordance with an example embodiment;

FIG. 12 is a detailed view of a conventional control rod blade (CRB);

FIG. 12A is a detailed view of the handle of the conventional CRB of FIG. 12;

FIG. 13 is a detailed view of a conventional control rod guide tube (CRGT);

FIG. 13A is a detailed view of the top of the conventional CRGT of FIG. 13;

FIG. 15 is a cut-away view of a conventional control rod;

FIG. 15A is a side view of the conventional control rod of FIG. 15 installed in the conventional core plate of FIG. 11;

DETAILED DESCRIPTION

Figure 1:
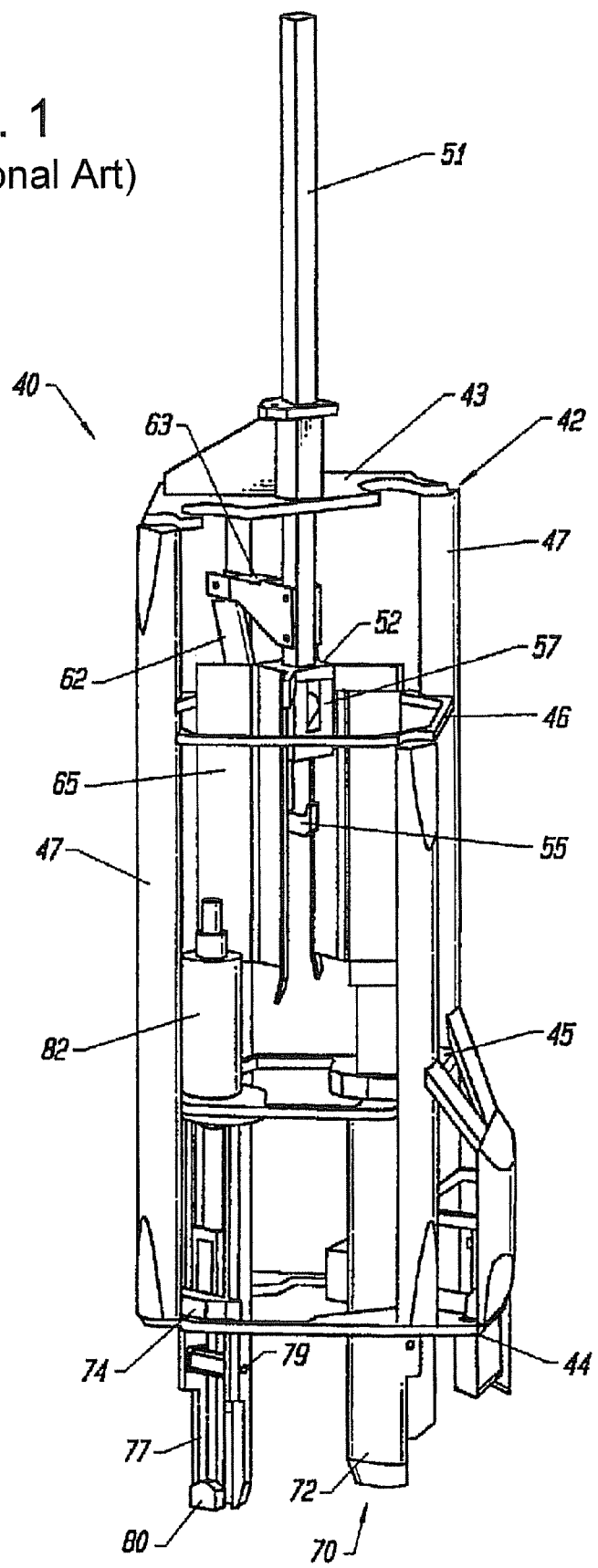
FIG. 1 is a perspective view of a conventional grapple.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 2:
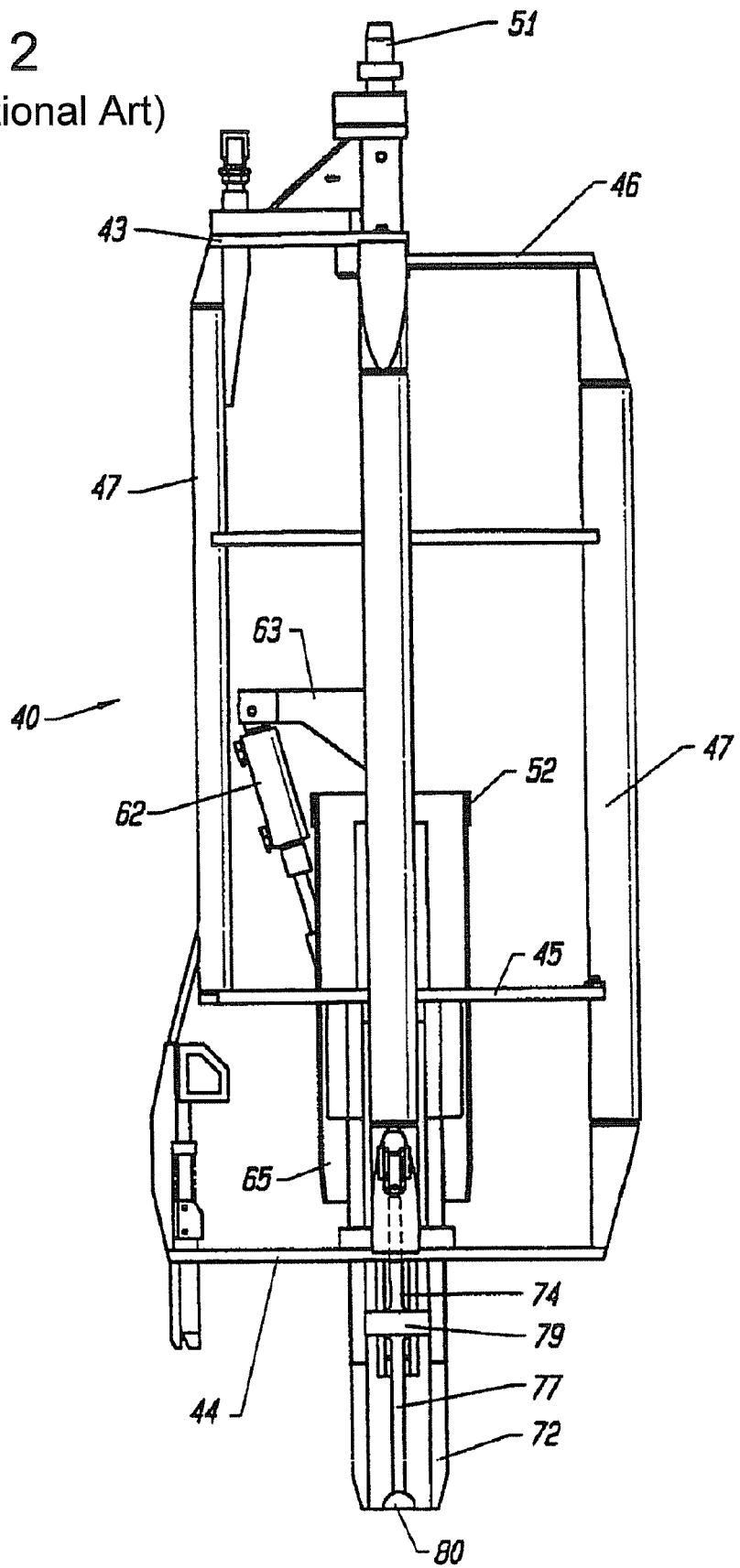
FIG. 2 is a side view of the conventional grapple of FIG. 1.
Figure 3:
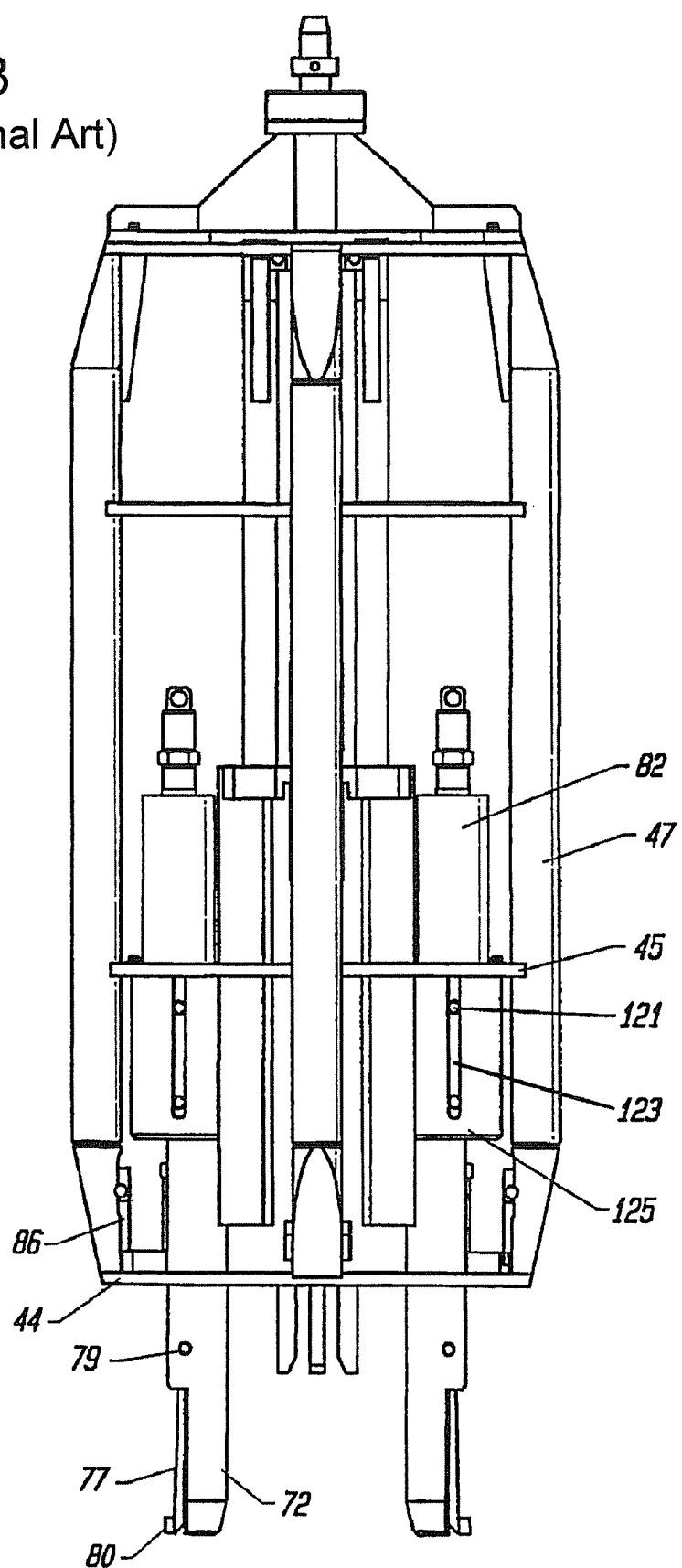
FIG. 3 is another side view of the conventional grapple of FIG. 1.

FIGS. 1-3 are perspective and side views of a conventional grapple 40. Grapple 40 may be used to lift, remove and replace a fuel supporting castings (FSC) 406 (FIG. 14) and control rod blades (CRB) 402 (FIG. 12) used within the reactor pressure vessel in boiling water reactors. Grapple 40 includes a frame 42, a control rod blade (CRB) hooking mechanism 55 having a sliding bar 51, and a pair of spaced apart fuel support casting (FSC) hook mechanisms 70. The CRB hooking mechanism 55 is designed to engage a top bail handle 22 of a control blade 20. The FSC hooking mechanisms includes two FSC hooks 80 facing opposing directions. The FSC hooks are designed to grab a FSC 406. Frame 42 includes a top plate 43, a bottom plate 44, a center plate 45 (FIG. 2), a support rim 46 positioned between the top 43 and center plates 45, and a plurality of five frame posts 47. The frame posts 47 extend between the bottom plate 44 and the top plate 43. Frame 42 may be an open structure with large central openings being provided between plates 43/44/45 for maintenance and use of grapple 40. In operation, the upper end of sliding bar 51 is coupled to a hoist cable (not shown) by a threaded connector. The hoist cable can be moved back and forth by an operator working from a refueling platform (not shown) to position grapple 40 during operation.

A header plate 52 is mounted on the bottom (distal) end of the sliding bar 51. The CRB hook 55 is pivotally coupled to cage 57 and extends downward from header plate 52. A first end of an air cylinder 62 is attached to sliding bar 51 by bracket 63. The second end of the air cylinder 62 is coupled to the CRB hook 55 such that actuation of the air cylinder in a first direction will cause the hook 55 to pivot forward towards a front of the grapple frame 42. When grapple 40 is properly positioned, this action will cause the CRB hook 55 to move from a withdrawn position to an extended position (as shown in FIGS. 16A-16B), when the CRB hook 55 is positioned under the top bail handle 22 of a control rod blade 20. When the air cylinder 62 is withdrawn, the CRB hook 55 will be withdrawn as well.

Figures 14, 14A:
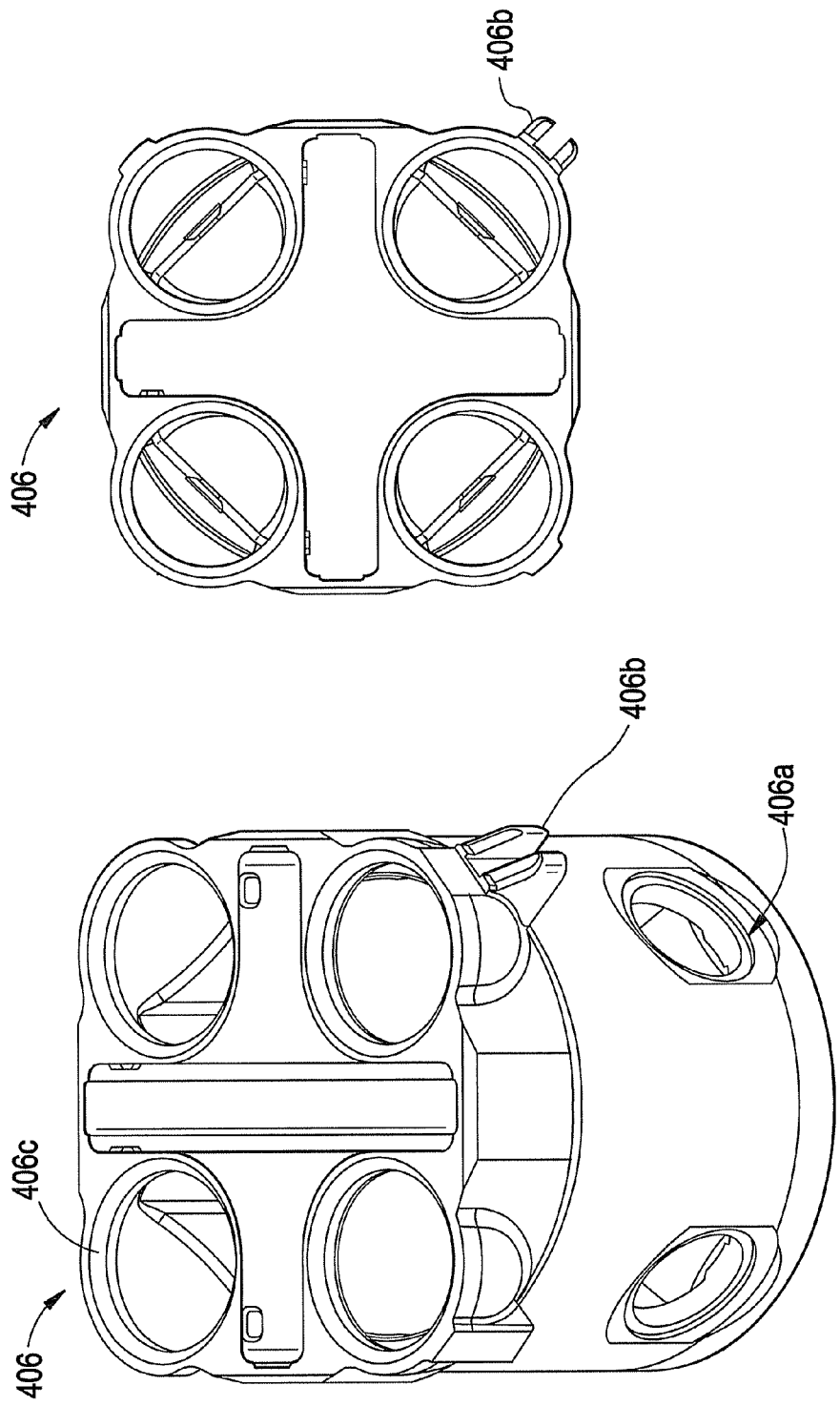
FIG. 14 is a perspective view of a conventional fuel support casting (FSC)
FIG. 14A is an overhead view of the conventional FSC of FIG. 14.

A pair of guides 65 are attached to opposing sides of the header plate 52 to assist with positioning the grapple 40 when grapple 40 is lowered into place. Guides 65 have tapered bottom surfaces that help ensure that grapple 40 will properly center over a control rod bail handle 22 when grapple 40 is lowered into place. Guides also limit flopping of a control rod blade 20 when the control rod blade 20 is being inserted or withdrawn from a reactor core. The sliding bar 51 carries the entire CRB hooking mechanism 55. When the grapple 40 is lowered into place over a control rod 400 (FIG. 15), the frame 42 will move together with the hoist cable until the bottom plate 44 of frame 42 comes into contact with the fuel support casting (FIG. 14). Thereafter, slider bar 51 will continue downward with the hoist cable until cage 57 seats on control rod bail handle 22. Thus grapple 40 is adapted to work with different sized control rods. Indeed, slider bar 51 is relatively long in order to accommodate any length BWR control rod. Slider bar 51 also provides the ability to lift the control rod 400 prior to lifting the fuel support casting 406 (FIG. 14), to verify that the control rod 400 has been unlatched from the control rod drive.

The FSC hooking mechanisms 70 are mirror images of one another, and will be described in more detail herein. Each FSC hooking mechanism 70 includes a fixed guide 72, a plunger 74, and a pivot bar 77. The FSC hooking mechanisms 70 are slidably coupled to frame 42 by a slot and pin arrangement (best shown in FIG. 3). Each guide 72 includes two pairs of opposing vertically spaced pins 121 (FIG. 3) which fit into a pair of vertically extending opposing slots 123 (also shown in FIG. 3) formed in retaining plates 125 that extend downward from center plate 45. Thus, the FSC hooking mechanisms 70 can travel a small distance vertically, relative to the frame, in an amount that is dictated by the arrangement of the pins 121 and slots 123.

Pivot bar 77 is pivotally coupled to guide 72 by a pivot 79. A FSC hook 80 is on the distal end of FSC hooking mechanism 70 and faces outward. The back surface of pivot bar 77 is positioned above pivot 79 and is inclined inward relative to the back surface of the portion of the pivot bar 77 that is located below the pivot 79. The FSC hooking mechanisms 70 are mounted to frame 42 in a manner such that guides 72 extend well below the bottom plate 44 of frame 42. Thus, when grapple 40 is positioned over a fuel support casting 406, guides 72 will extend into diagonally opposite side flow orifices 406a of the casting 406 (see FIG. 14).

A pair of mechanical switches 86 (see FIG. 3) are positioned on a top surface of bottom plate 44 to prevent air cylinders 82 from releasing while a fuel support casting 406 (FIG. 14) is being held. The fuel support casting 406 is supported by plungers 74 and the FSC hooks 80 rather than bottom plate 44 of frame 42. Since the FSC hooking mechanisms 70 are slidable a small distance relative to the frame 42, when a fuel support casting 406 is lifted, a small gap will be formed between bottom plate 44 and the fuel support casting 406. In this configuration, switches 86 will not be engage the fuel support casting 406, and therefore switches 86 will be closed. Switches 86 are arranged such that when they are closed, switches 86 will prevent air cylinder 82 from releasing. However, when a fuel support casting 406 has been set on a firm surface the slot and pin arrangement 121, 123 permit the FSC hooking mechanisms 70 to rise a small amount relative to frame 42, the bottom plate 44 is permitted to come into contact with fuel support casting 406, thereby opening switches 86. The open switches 86 permit air cylinders 82 to release when an operator seeks to release fuel support casting 406.

FIG. 4A/4B are schematic drawings of a pivot bar 77 portion of a fuel support casting (FSC) hook mechanism 70 of the conventional grapple 40 of FIG. 1. Plunger 74 has a roller 75 (FIGS. 4A/4B) positioned at a distal end of plunger arm 74a which is driven vertically up and down relative to frame 42 by rod 83 of air cylinder 82 mounted on the top of guides 72 (see FIG. 3). Plunger roller 75 is arranged to engage a back surface of pivot bar 77. Guide roller 78 is connected to a back side of plunger arm 74a to run along guide 72. Thus, as can be best seen in FIG. 4A, when plunger 74 is extended to a lowered position, roller 75 engages a flat back surface of pivot bar 77 at a location below pivot 79. In this position, hook 80 is pushed outward (see FIG. 4A) to a position that engages a lip of the fuel support casting side flow orifice 406a (FIG. 14). When plunger 74 is raised to a withdrawn position (see FIG. 4B), roller 75 engages an inclined back surface portion of pivot bar 77 at a location above pivot 79, as shown in FIG. 4B. In this position, pivot bar 77 pivots in a counterclockwise direction about pivot 79 (see the difference between FIGS. 4A and 4B), such that hook 80 is pulled back toward guide 72. In this position (the position shown in FIG. 4B), hook 80 cannot engage a lip of the fuel support casting side flow orifice 406a.

Plunger 74 has a substantially frustum shaped contact pad 76 that is designed to seat on a rim of a fuel support casting upper flow orifice 406c (FIG. 14) when air cylinder rod 83 strokes downward. That is, plunger contact pad 76 will seat on a rim of a beveled upper flow orifice 406c of fuel support casting 406. Contact pad 76 therefore provides a solid supporting surface that cooperates with hook 80 to hold a fuel support casting 406, independent of the rest of the grapple unit. Since plunger 74 can stroke down a variable distance, relative to hook 80, while still causing hook 80 to engage, this design can readily and affirmatively pick up a fuel support casting 406 regardless of a distance between a top of the fuel support casting 406 and a bend in the flow hole channel (see the position of upper low orifice 406c relative to side flow orifice 406a of FIG. 14). Guide rollers 78 serve to guide plunger 74 and support a reaction force of hook 80.

Air cylinders 82 are operated by a pair of air lines (not shown) that are connected to grapple 40 from the refueling bridge. Center plate 45 (FIG. 3) has a pair of slotted keyways (not shown) through which air fittings for air cylinders 82 extend to provide a coupling for their associated air hose.

The described grapple 40 has several advantages. One advantage is that it can be used with a fuel support casting 406 in place. Another is that it will work with control rods of any length. A third advantage is that, when it is used during a control rod moving operation, it can be used with a blade guide (that supports the control rod) seated on the fuel support casting 406.

Figure 5:
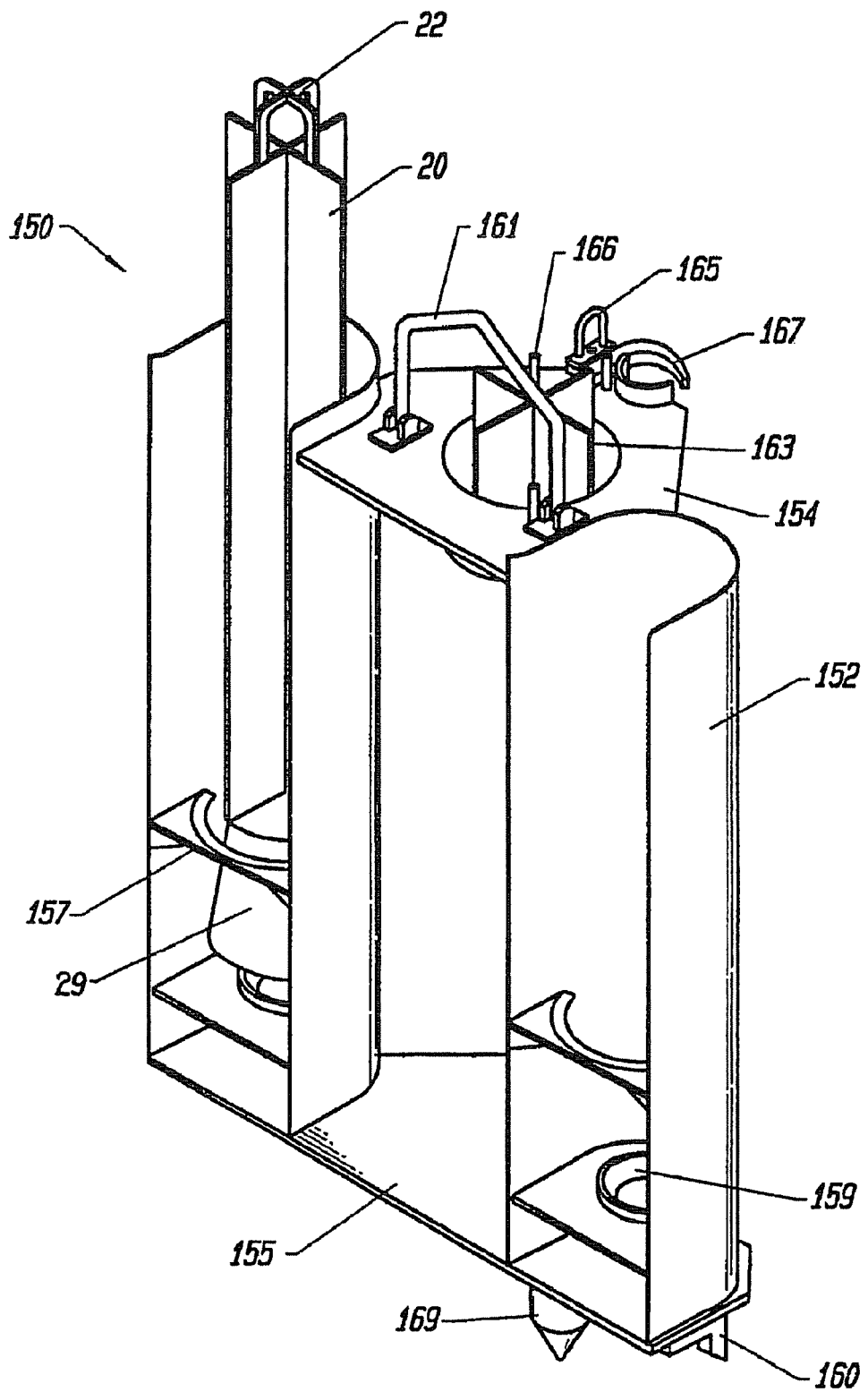
FIG. 5 is a perspective view of a conventional, temporary storage rack.

FIG. 5 is a perspective view of a conventional, temporary storage rack 150. Storage rack 150 includes a pair of substantially parallel troughs 152 that extend between a top plate 154 and a bottom plate 155. Each trough 152 has a shoe-shaped retaining bar 157 that extends across an open front of trough 152 with a seat 159 that is shaped to receive a socket of velocity limiter 29. Top plate 154 has a pivoted bail handle 161, a cruciform fuel support storage seat 163, a hook 165, a pair of opposing anti-rotation pins 166 and a spring loaded safety catch 167. Fuel support storage seat 163 and the anti-rotation pins 166 are provided to receive and position a fuel support, respectively. The pair of opposing anti-rotation pins 166 are provided so that a fuel support can be placed on storage rack 150 in one of two orientations. When a fuel support is properly positioned, the anti-rotation pin 166 will slide into a positioning slot (not shown) in bottom plate 44 of grapple 40. This will actuate air switch 133, which permits FSC hooking mechanisms 70 to release the fuel support casting 406. Bail handle 161, hook 165 and safety catch 167 are used for installation, securing and removal of storage rack 150.

During installation, crane hook holds storage rack 150 by bail handle 161 and moves rack 150 into place. Spring loaded safety catch 167 is designed to latch onto one of the pressure vessel guide rods, and cooperates with two feet 160 and a centering pin 169 (which extend from the bottom surface of the bottom plate 155), to position storage rack 150. Specifically, pin 169 fits into a hole (not shown) in the guide rod bracket that extends between the shroud and the guide rod (not shown). Feet 160 seat on the upper rim of the shroud. It is contemplated that storage rack 150 will not be permanently installed within the reactor vessel. Rather, it would be installed during maintenance operations in which the control rods will be repositioned. Thus, bail handle 161 and hook 165 will be used for removing the storage rack as well.

Suitable methods of installing, removing and repositioning control rods using the grapple 40 will now be explained. To remove a control rod that is currently installed, an operator stationed on the refueling platform manipulates a grapple hoist cable such that the grapple 40 is lowered into position directly over a selected control rod. When grapple 40 is positioned over an end of a control rod, guides 65 slide into upper flow orifices 406*c* to fine position grapple 40. As grapple 40 is lowered, bottom plate 44 of frame 42 will come to rest against the fuel support casting 406. As the hoist cable is further lowered, sliding bar 51 will slide relative to frame 42 until cage 57 carried by the sliding bar 51 contacts a top of the control rod bail handle 22. In this fully lowered position, distal ends of the fuel support mechanisms 70 will have slid into respective upper flow orifices 406*c* and bottom plate 44 will rest on the top of the fuel support casting 406. At the same time, control rod hooking mechanism 55 rests on bail handle 22.

Air cylinders 62 and 82 are then actuated to pivot CRB hook 55 and FSC hooks 80 into place, respectively. Actuation of air cylinder 82 also serves to seat contact pads 76 into tapered upper flow orifices 406*c* of the fuel support casting 406. After the control rod release handle has been pulled and air cylinders 62 and 82 have been actuated, sliding bar 51 is lifted a small amount to verify that the control rod drive has been properly released. Thereafter, the grapple hoist cable can be lifted. When this occurs, the control rod blade 20 will be lifted before the fuel support casting 406 (due to movement of sliding bar 51, relative to frame 42). Thus, the operator can verify that grapple 40 has a good hold of the control rod blade 20. Thereafter, bracket 63 comes into contact with top plate 43, and the entire grapple 40 is lifted, which serves to simultaneously lift the control rod blade 20 and the fuel support casting 406 from a fuel channel.

It is contemplated that the fuel support casting 406 will always be removed together with control rod blade 20. Therefore, when the control rod blade 20 is to be discarded after it has been removed, grapple 40 can be used to remove both the control rod blade 20 and the fuel support casting 406. The control rod blade 20 can then be lifted out of the pressure vessel and placed into the fuel pool. A new control rod blade 20 can then be picked up by grapple 40 and inserted into a selected core location together with the original fuel support casting 406 which may be continually held by grapple 40. If for any reason grapple 40 needs to be used for other purposes, fuel support casting 406 can be placed in an appropriate storage location which may be in the storage rack 150 or on the reactor floor.

On the other hand, when the position of a control rod blade 20 is to be shifted about the core, both the fuel support casting 406 and the control rod blade 20 will be placed in storage rack 150. That is, the control rod blade 20 will initially be placed in one of the troughs 152. Thereafter, the fuel support casting 406 is placed on the storage seat 163. When the fuel support casting 406 is properly positioned over anti-rotation pins 166, the fuel support casting 406 can be released. Thereafter, grapple 40 will be positioned over a second control rod located at the position at which the first control rod is to be shifted to. The second control rod and its associated fuel support casting are then removed in the same manner as described above. The second control rod blade 20 is then placed in a second trough while the second fuel support casting 406 remains held by the grapple 40. The grapple 40 is then used to pick up the first control rod blade 20 from the storage rack. The first control rod blade 20, together with the second fuel support casting 406 are then inserted into the second channel. This process can be repeated as necessary to shift or replace all of the control rods that are to be moved. When a control rod blade is to be inserted into the position from which the fuel support casting on the storage rack came, the fuel support on the storage rack is picked up together with the selected control rod and placed in the corresponding channel.

When the position of a control rod is to be switched within the reactor core, grapple 40 may be used to remove a control rod along with the fuel support casting and place it in the storage rack. A second control rod/fuel support is removed in a similar manner, and the second control rod is also placed in the storage rack. The second fuel support is retained and placed over the first control rod, which is grappled and moved to the second core location. The control rod and fuel support are placed in the core. The grapple is then used to grab the first fuel support from the storage rack, place it over the second control rod, grapple it, and move them both to the first cell location. This process or a variation using more than two control rods can be repeated until all of the control rods that are to be shifted have been moved.

Figure 6:
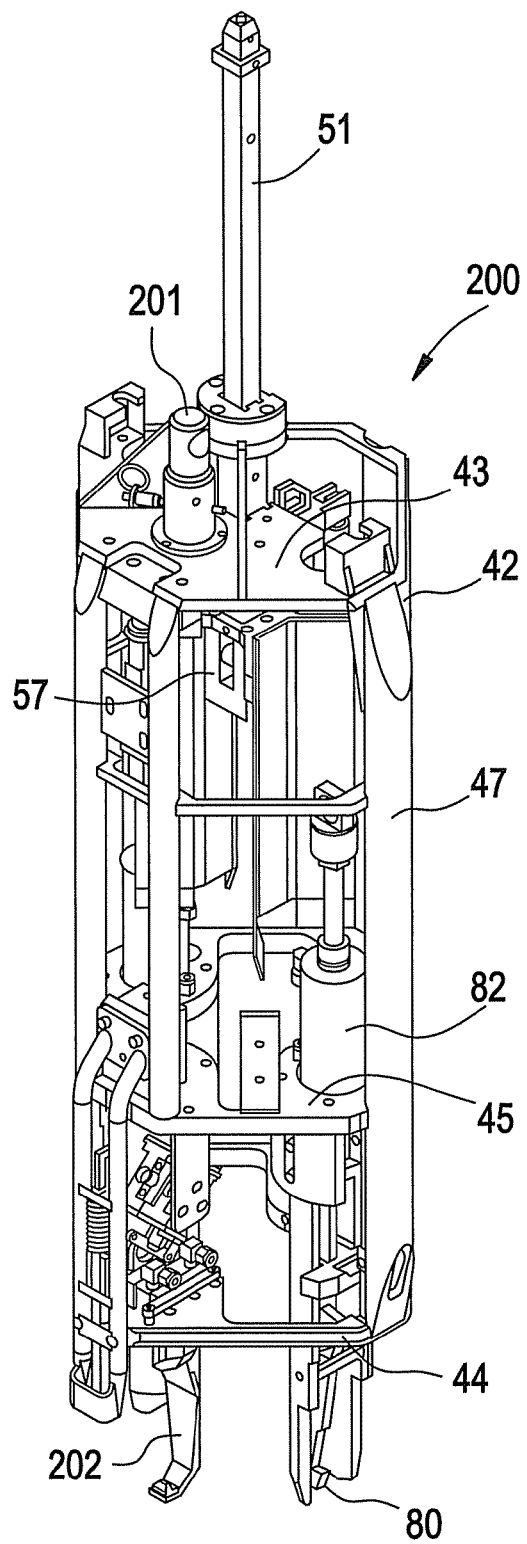
FIG. 6 is a perspective view of a grapple, in accordance with an example embodiment.

FIG. 6 is a perspective view of a grapple 200, in accordance with an example embodiment. The grapple 200 may be similar and/or identical to the grapple of FIG. 1 (notice several of the same reference characters in FIG. 6 and FIG. 1, identifying some of the many common components), but may additionally include a pair of control rod guide tube (CRGT) hooks 202 and a selector switch 201. Selector switch 201 may allow pneumatic control of the CRGT hooks 202 to be turned on or off, thereby allowing the function of CRGT hooks 202 to be turned on or off as desired, as described herein in more detail.

Figure 8:
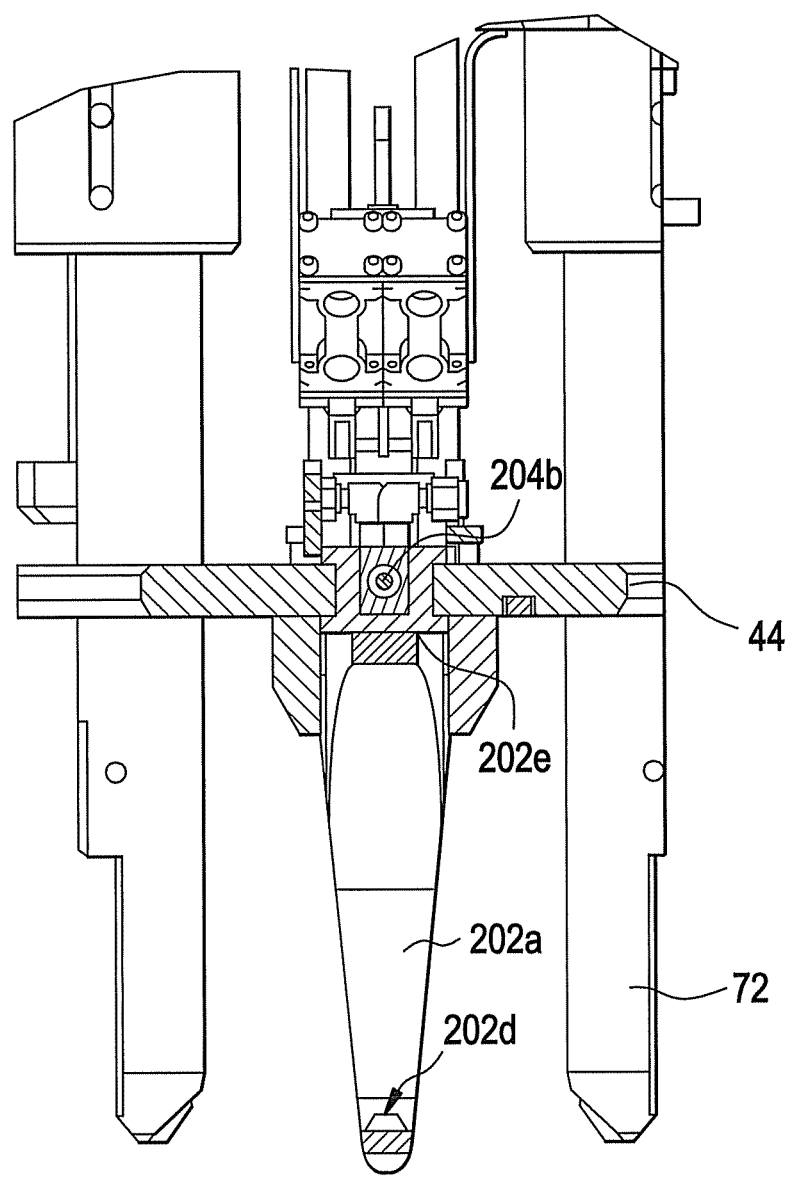
FIG. 8 is a close-up side view of the CRGT hook installed on the grapple, in accordance with an example embodiment.

FIGS. 6A/6B are side views of the grapple 200 of FIG. 8, in accordance with an example embodiment. CRGT hooks 202 may extend from a bottom of frame 42 at locations that oppose each other. That is to say, the "hook" portion 202*f* (shown in more detail, in FIG. 9) of each CRGT hook 202 faces away from each other, just as the FSC hooks 80 inside of guide 72 also oppose each other (and face away from each other). CRGT hooks 202 may be slideably connected to bottom plate 44 so that CRGT hooks 202 may have a range of motion (M) that is parallel to bottom plate 44. The range of motion (M) of each CRGT hook 202 may cause CRGT hooks 202 to expand and contract as CRGT hooks 202 move along bottom plate 44. Movement of the CRGT hooks 202 may be orchestrated to occur simultaneously, meaning that the CRGT hooks 202 may expand and contract in unison with each other. The range of motion (M) of CRGT hooks 202 may occur in a plane that is approximately perpendicular to a plane that exists containing the range of motion (M1) of FSC hooks 80 (as shown in FIGS. 4A/4B, FSC hooks 80 may retract and extend while swinging on pivot 79).

Figure 6C:
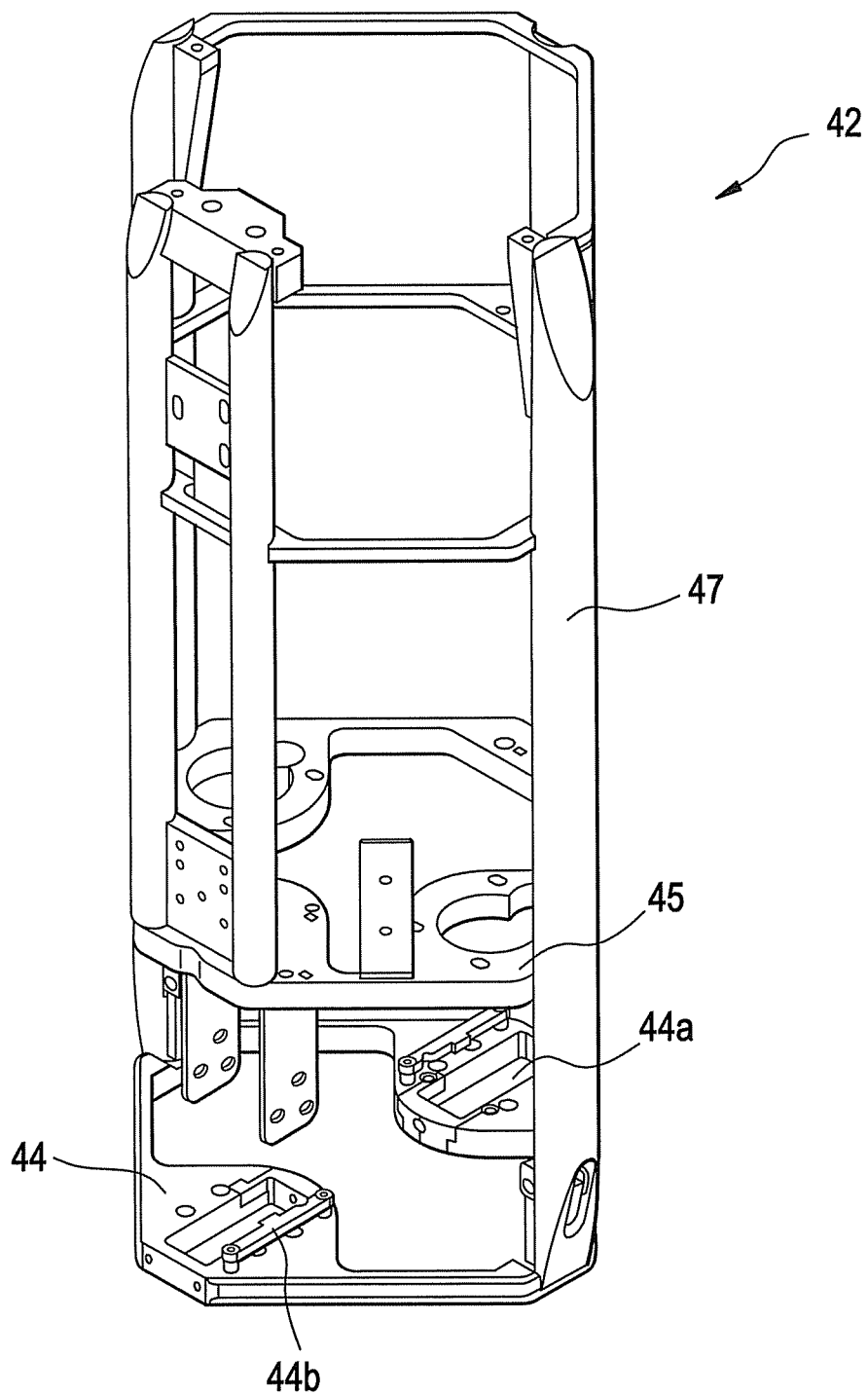
FIG. 6C is a detailed view of the frame of the grapple of FIG. 6, in accordance with an example embodiment.

FIG. 6C is a detailed view of the frame 42 of the grapple of FIG. 6, in accordance with an example embodiment. Bottom plate 44 may include diagonally-positioned through-holes 44*a* that allow each CRGT hook 202 to slide within bottom plate 44. Cylinder reaction 44*b* may be included along a side of each through-hole 44*a*. Cylinder reaction 44*b* may be a bracket that includes connection points for pneumatic air (both an inlet air connection, and an outlet air connection) that may be provided to both pipe fittings 204*a*1/204*a*2 (see FIG. 7) via flexible hose connections (not shown) to control movement of the CRGT hooks 202.

Figure 7:
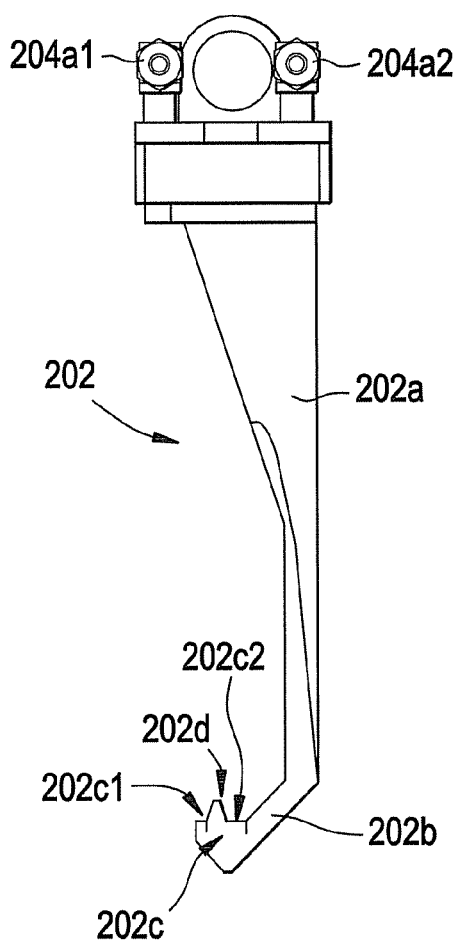
FIG. 7 is a side view of a control rod guide tube (CRGT) hook, in accordance with an example embodiment.

FIG. 7 is a side view of a control rod guide tube (CRGT) hook 202, in accordance with an example embodiment. Each CRGT hook 202 may include two pipe fittings 204*a*1/204*a*2 that drive the operation of cylinder rod 204*b* (see the retracted position of cylinder rod 204*b* in FIG. 7E, and the extended position of cylinder rod 204*b* in FIG. 7F). Pipe fitting 204*a*1 may act as "air in," when cylinder rod 204*b* is being extended, while pipe fitting 204*a*2 may act as "air out." The "air in"/"air out" roles of the pipe fittings 204a1/204a2 may then be reversed, when cylinder rod 204b is being retracted.

Hook body 202a may be a vertically extending long body with a distal end that curves (at offset 202b) to form a hook portion 202f of each CRGT hook 202. The hook portion 202f may have a horizontally extending piece 202c that projects away from offset 202b. The horizontally extending piece 202c may include an inner landing surface 202c2 that is a flat surface between offset 202b and back-off tab 202d. On a distal end of the horizontally extending piece 202c, an outer landing surface 202c1 may be provided, which may be a small, flat horizontal surface. Between the inner and outer landing surfaces 202c2/202c1 may be a back-off tab 202d that may be in the shape of a pointed, triangularly shaped nipple. The back-off tab 202d may have a longitudinal length that extends across the horizontally extending piece 202c to entirely separate the inner and outer landing surfaces 202c2/202c1 from each other.

Figure 16:
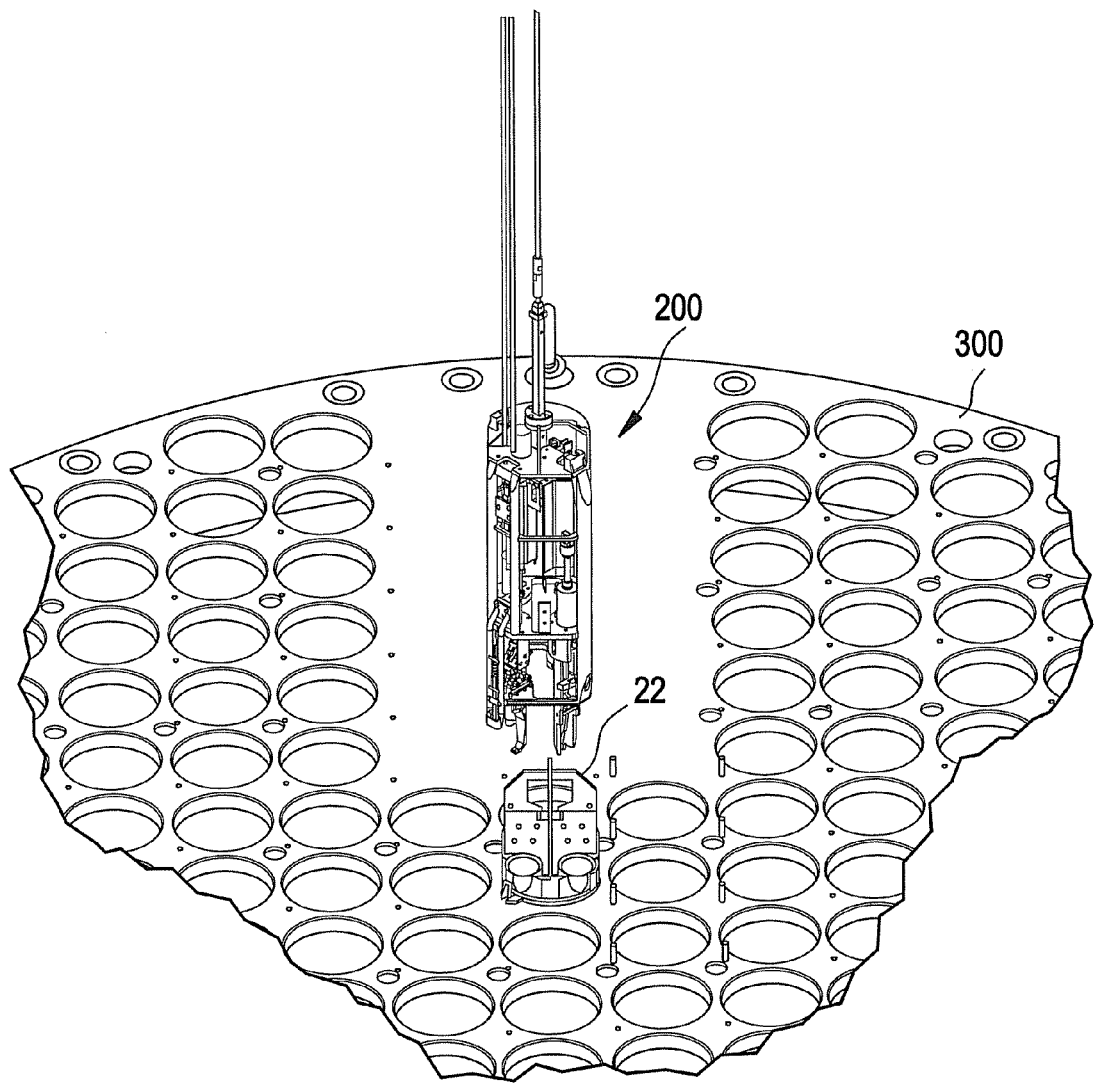
FIG. 16 is a perspective view of a grapple preparing to engage a control rod, in accordance with an example embodiment.
Figure 16C:
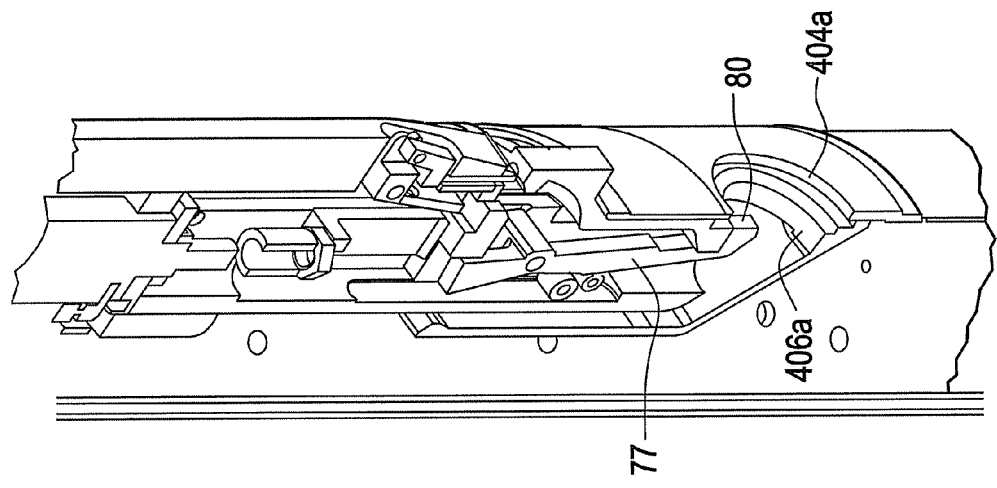
FIG. 16C/16D are detailed views of a FSC hook of the grapple engaging the FSC, in accordance with an example embodiment.
Figure 16D:
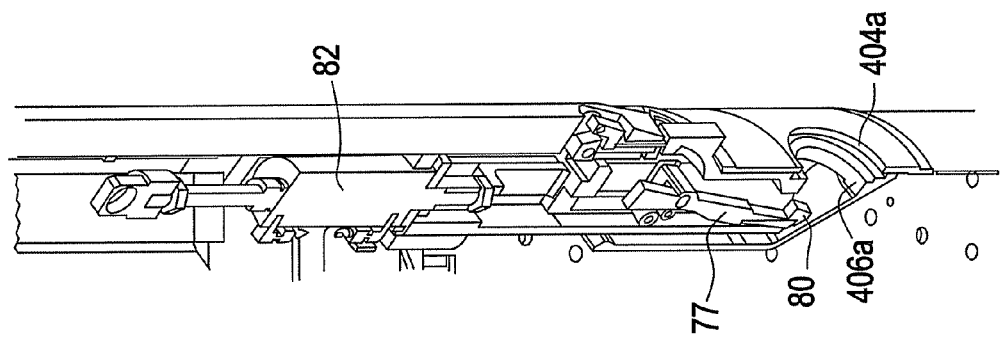
FIG. 16A/16B are detailed views of a CRB hook of the grapple engaging the handle of the CRB, in accordance with an example embodiment.
FIGS. 16E/16F are detailed views of the CRGT hook of the grapple engaging the CRGT, in accordance with an example embodiment.
FIG. 16G is a view of the grapple and the top of control rod, after the grapple has grasped the control rod, in accordance with an example embodiment.
FIG. 16H is a detailed view of the CRGT hook, after the CRGT hook has grasped the CRGT, in accordance with an example embodiment.
Figure 16G:
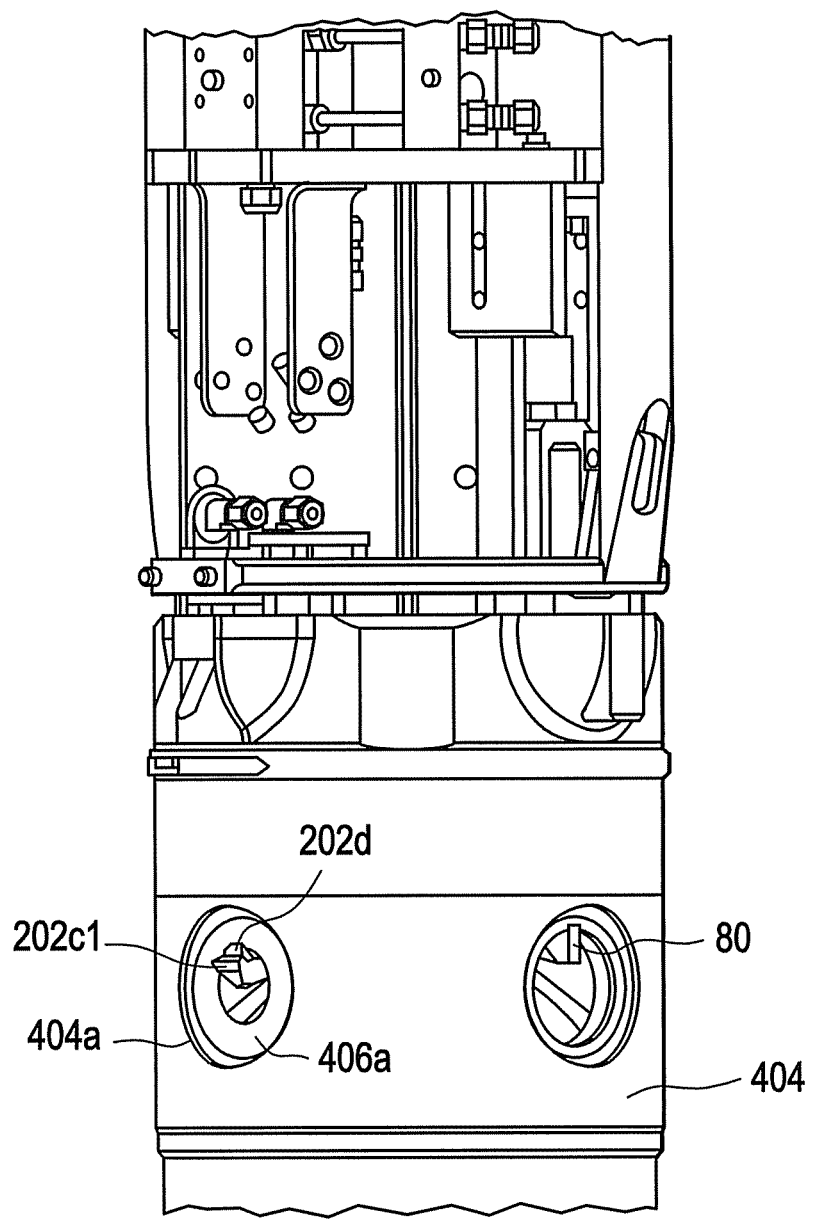
Figure 16H:
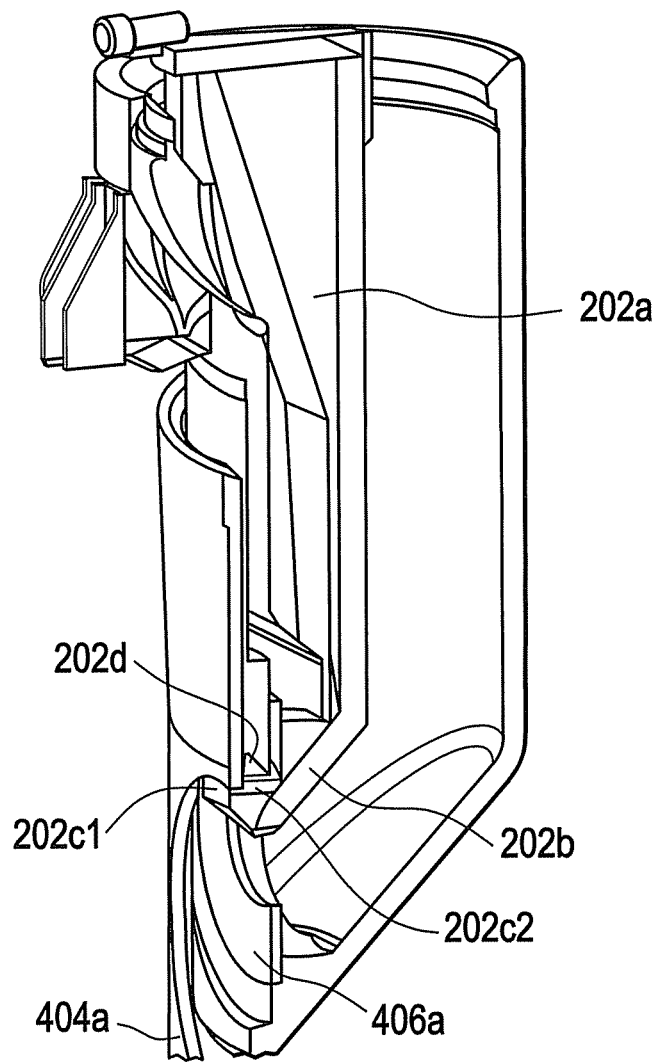

A length of the inner landing surface 202c2 of the horizontally extending piece 202c may be sized to be slightly longer than a thickness of a FSC side flow orifice 406a (see inner landing surface 202c2 supporting FSC side flow orifice 406a in FIG. 16H). A length of the outer landing surface 202c1 of the horizontally extending piece 202c may be sized to extend beyond the confines of a CRGT flow orifice 404a when the CRGT hook 202 engages control rod 400 (see outer landing surface 202c1 extending slightly beyond the lip of the CRGT flow orifice 404a in FIG. 16H). A width of back-off tab 202d may be sized to fit between fuel support casting 406 and control rod guide tube 404, to ensure that back-off tab 202d maintains some separation between fuel support casting 406 and control rod guide tube 404 in transit.

Figure 7A:
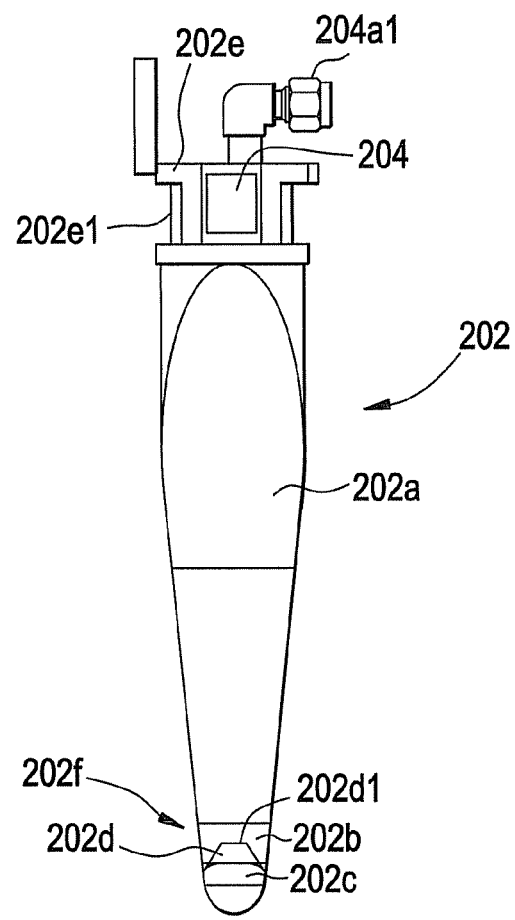
FIG. 7A is a front view of the CRGT hook of FIG. 7, in accordance with an example embodiment.
Figure 9:
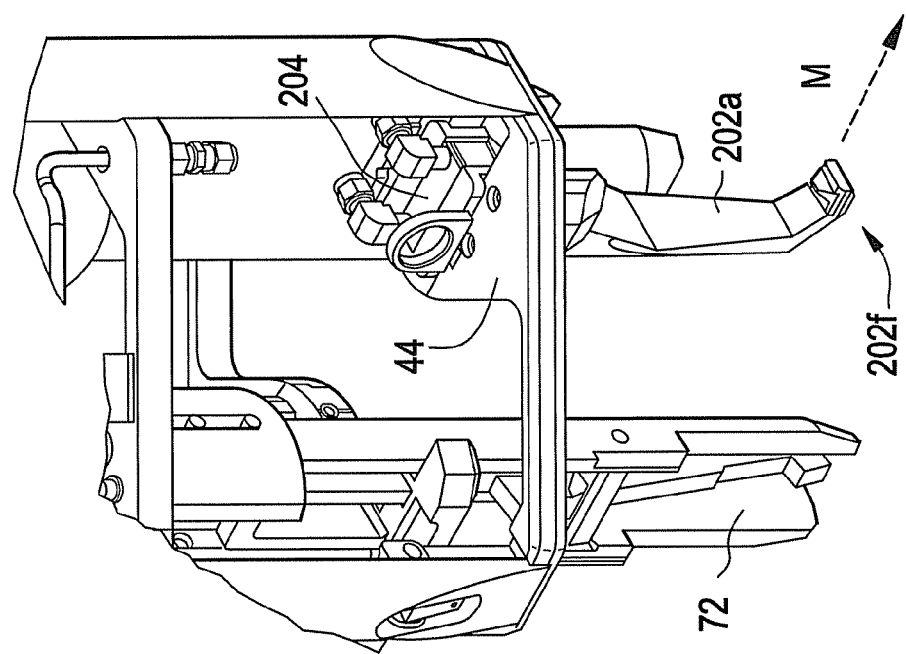
FIG. 9 is a perspective view of the CRGT hook installed on the grapple, showing the motion of the CGRT hook, in accordance with an example embodiment.

FIG. 7A is a front view of the CRGT hook 202 of FIG. 9, in accordance with an example embodiment. Pipe fitting 204a1 (and similarly, pipe fitting 204a2, not shown in this drawing) may be facing one side of CRGT hook 202. This allows each pipe fitting 204a1/204a2 to face cylinder reaction 44b (FIG. 6C), with flexible hose (not shown) connecting pneumatic air from cylinder reaction 44b to the pipe fittings 204a1/204a2, without kinking of the flexible hose. A pneumatic cylinder 204 may be located near the top of CRGT hook 202, to drive the movement of cylinder rod 204b (FIG. 7F), and in turn provide movement for each CRGT hook 202 (see the CRGT hook 202 range of motion, M, in FIG. 8B). Pneumatic cylinder 204 may be housed in cylinder cradle 202e. Cylinder cradle 202e may include an overhang 202e4 and a bearing surface 202e on either side of the cylinder cradle 202e. Each bearing surface 202e may contact a side of through-hole 44a (FIG. 6C), while overhang 202e4 may rest on a top surface of bottom plate 44 (also FIG. 6C), allowing CRGT hook 202 to hang and slide within through-hole 44a of bottom plate 44.

The front shape of hook body 202a may progressively taper toward the distal end of the CRGT hook 202 (i.e., near the hook portion 202f of hook 202). Back-off tab 202d may also be tapered, with a pointed flat upper surface 202d1 on a distal end of the back-off tab 202d.

Figure 7B:
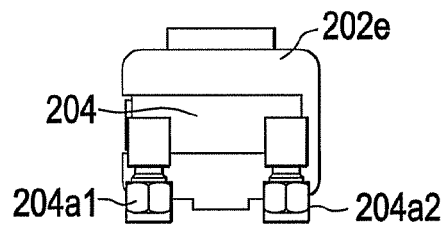
FIG. 7B is an overhead view of the CRGT hook of FIG. 7, in accordance with an example embodiment.

FIG. 7B is an overhead view of the CRGT hook 202 of FIG. 7, in accordance with an example embodiment. Notice that cylinder cradle 202e may hold pneumatic cylinder 204, while pipe fittings 204a1/204a2 project above pneumatic cylinder 204 and cylinder cradle 202e.

Figure 7C:
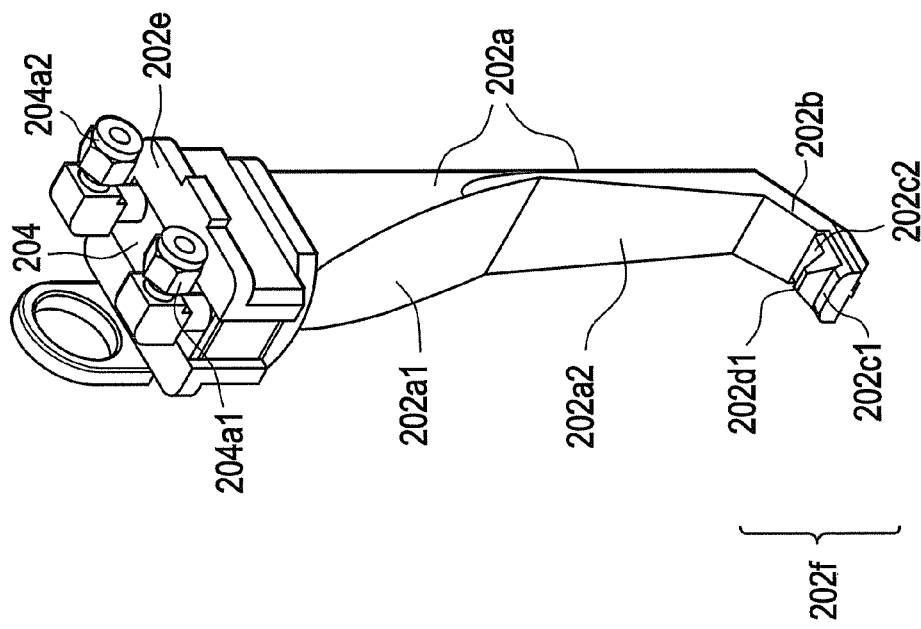
FIG. 7C is a perspective view of the CRGT hook of FIG. 7, with the pneumatic cylinder removed from the hook, in accordance with an example embodiment.

FIG. 7C is a perspective view of the CRGT hook 202 of FIG. 7, with the pneumatic cylinder removed from the hook, in accordance with an example embodiment. Cylinder cradle aperture 202e3 (also shown in FIGS. 7E/7F) may be included in a rear position of an inner recess 202e2 of cylinder cradle 202e.

Figure 7D:
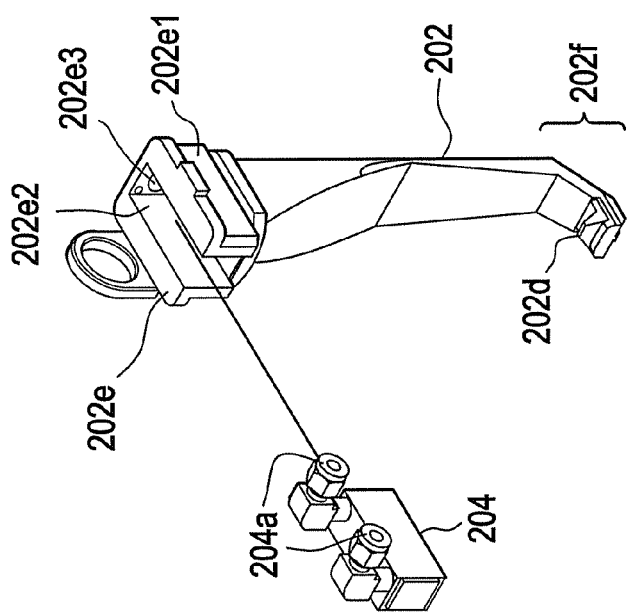
FIG. 7D is another perspective view of the CRGT hook of FIG. 7, in accordance with an example embodiment.

FIG. 7D is a perspective view of the CRGT hook 202 of FIG. 7, in accordance with an example embodiment. FIG. 7D depicts, with better clarity, a tapered portion 202a1 of hook body 202a and a straight portion 202a2. The tapered portion 202a1, the straight portion 202a2, and the offset portion 202b of CRGT hook 202 allow the shape of hook 202 to conform to an inner curved flow channel (between upper flow orifice 406c and side flow orifice 406a of FIG. 14) of a fuel support casting 406. FIG. 7D also shows the tapered nature of back-off tab 202d, and in particular the pointed, flat upper surface 202d1 of back-off tab 202d.

FIGS. 7E/7F are rear perspective views of the CRGT hook 202 of FIG. 7, with cylinder rod 204b in a retracted and extended position, respectively. Pneumatic air supplied to pipe fittings 204a1/204a2 may drive the movement of the cylinder rod 204b. Movement of the cylinder rod 204 is allowed via the existence of aperture 202e3 which penetrates cylinder cradle 202e.

FIG. 8 is a close-up side view of the CRGT hook 202 installed on the grapple 200, in accordance with an example embodiment. Notice the location of cylinder cradle 202e and cylinder rod 204b that are centrally located within through-hole 44a (FIG. 6C) of bottom plate 44.

FIG. 9 is a perspective view of the CRGT hook 202 installed on the grapple 200, showing the motion (M) of the CGRT hook 202, in accordance with an example embodiment. FIG. 9 shows CRGT hook 202 in a fully retracted position.

Figure 10:
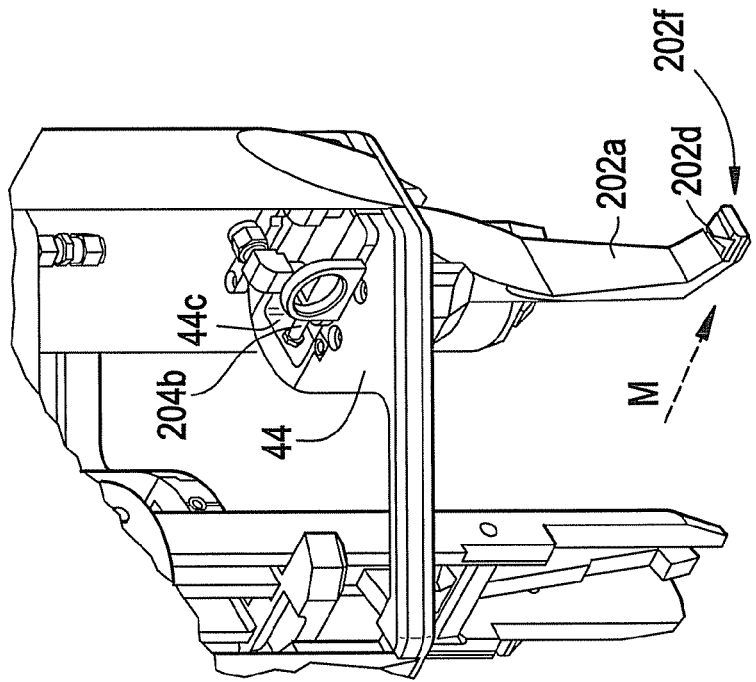
FIG. 10 is another perspective view of the CRGT hook installed on the grapple, showing the motion of the CGRT hook, in accordance with an example embodiment.

FIG. 10 is another perspective view of the CRGT hook 202 installed on the grapple 200, showing the motion (M) of the CGRT hook 202, in accordance with an example embodiment. FIG. 10 shows CRGT hook 202 in a fully extended position.

Figure 11:
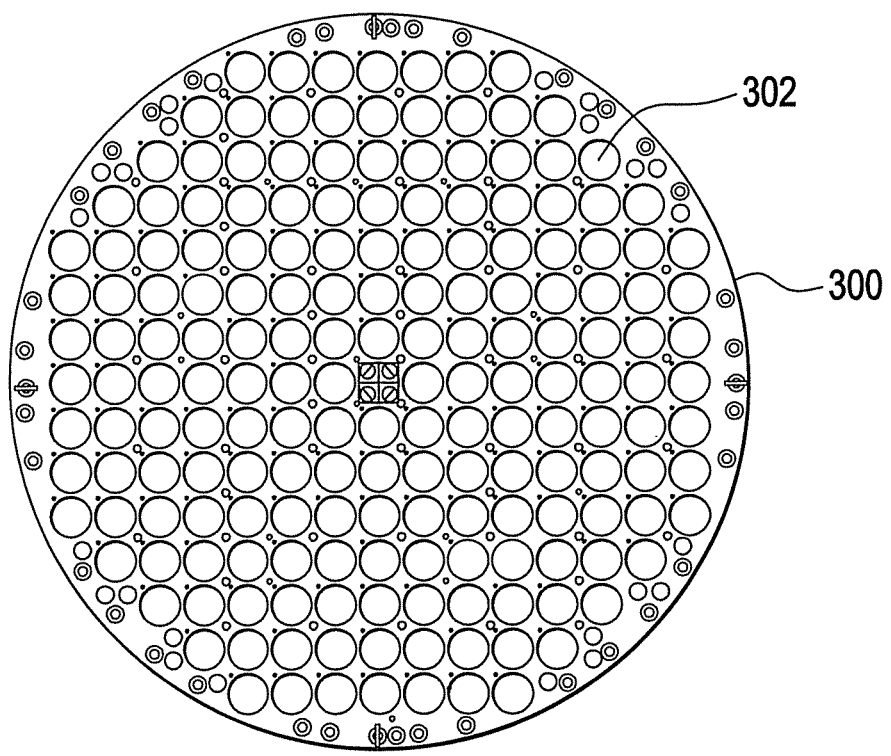
FIG. 11 is an overhead view of a conventional core plate.

FIG. 11 is an overhead view of a conventional core plate 300. Fuel support channels 302 house control rods 400 (FIG. 15), which are not shown in FIG. 11.

FIG. 12 is a detailed view of a conventional control rod blade 20 (CRB). The control rod blade 20 is similar to the control rod blade 20 of FIG. 5, but shown in more detail in this figure. Handle 22 is included at the top of the control blade 20, with a velocity limiter 29 included near the bottom of the control blade 20. As shown in FIG. 15, the control rod blade 20 is positioned lengthwise along a centerline of the overall control rod 400.

FIG. 12A is a detailed view of the handle 22 of the conventional control rod blade 20 of FIG. 12.

FIG. 13 is a detailed view of a conventional control rod guide tube (CRGT) 404. As shown in FIG. 15, the CRGT 404 forms a lengthwise outer shell of the overall control rod 400.

Figure 15B:
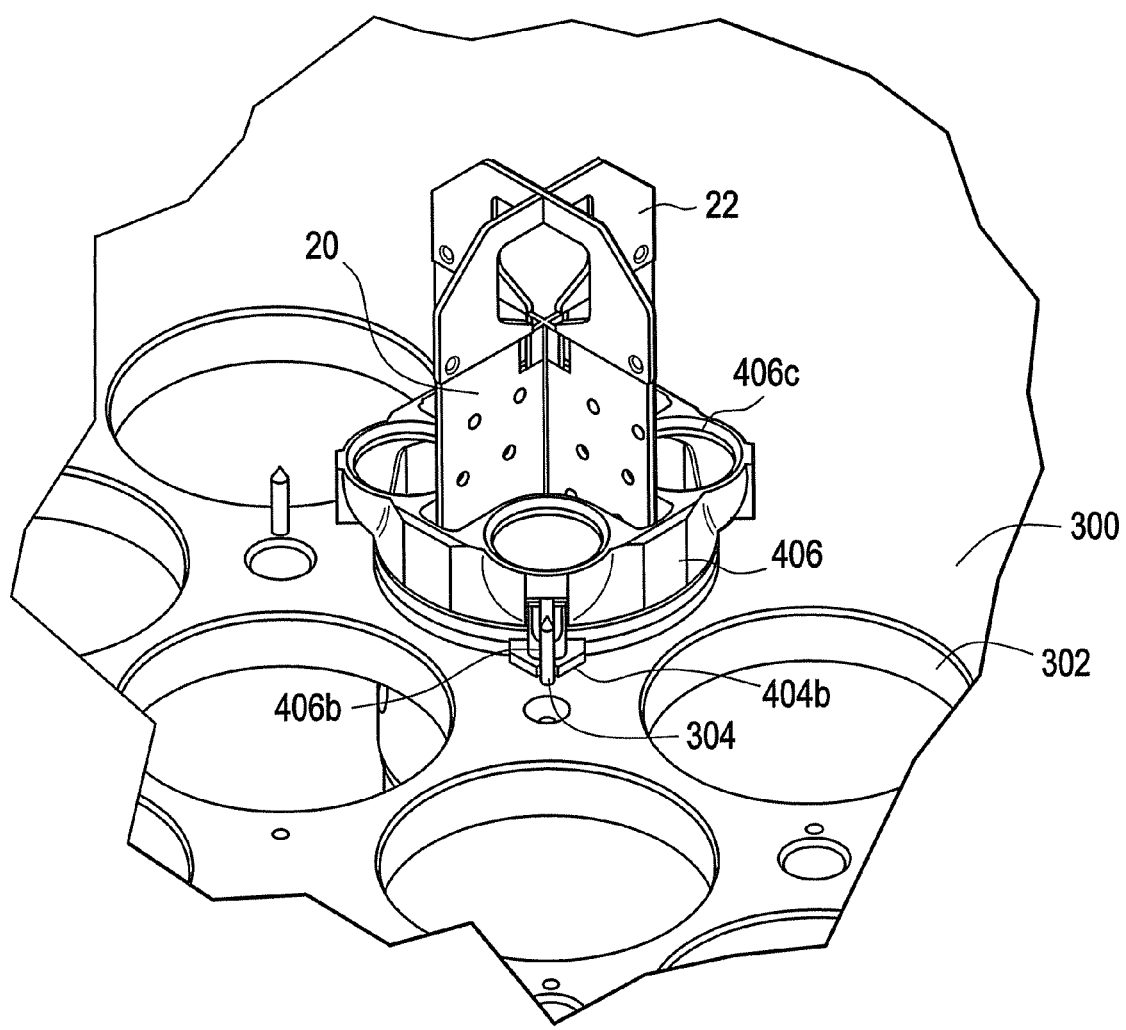
FIG. 15B is a top view of the conventional control rod installed in the conventional core plate, as shown in FIG. 15A.

FIG. 13A is a detailed view of the top of the conventional CRGT 404 of FIG. 13. Note that four equally spaced apart guide tube flow orifices 404a are located along the outer periphery of the CRGT 404. Alignment tabs 404b hold the CRGT 404 into place on core plate 300 within a respective fuel support channel, as shown in FIG. 15B.

FIGS. 14/14A are perspective and overhead views of a conventional fuel support casting (FSC) 406. Four upper flow orifices 406c are included in each of four quadrants of the FSC 406. Four curved channels (not shown) exists within the FSC 406, which connect each upper flow orifice 406c with a respective side flow orifice 406a. Alignment guides 406b rest above the alignment tabs 404b (FIG. 13A) of the CRGT 404, when the control rod 400 is installed in core plate 300 (as shown in FIG. 15B).

FIG. 15 is a cut-away view of a conventional control rod 400. The FSC 406 holds control rod blade 200 in position at the top of the control rod 400, as the majority of control blade 200 including velocity limiter 29 is housed in CRGT 404.

FIG. 15A is a side view of the conventional control rod 400 of FIG. 15, installed in the conventional core plate 300 of FIG. 11.

FIG. 15B is a top view of the conventional control rod 400 installed in the conventional core plate 300, as shown in FIG. 15A. Alignment pins 304 of core plate 300 are captured by FSC alignment guide 406b and CRGT alignment tab 404b, to ensure that control rod 400 does not rotate within core plate 300. Notice that FSC upper flow orifices 406c are located in each quadrant of FSC 406 that is subdivided by the control blades 20.

FIG. 16 is a perspective view of a grapple 200 preparing to engage a control rod 400 installed in core plate 300, in accordance with an example embodiment.

FIG. 16A/16B are detailed views of the CRB hook 55 of grapple 200 engaging the handle 22 of the control rod blade (CRB) 20, in accordance with an example embodiment. Cylinder 62 operating off of bracket 63 mobilizes CRB hook 55 to grasp handle 22. FIG. 16A shows CRB hook 55 in a retracted position, and FIG. 16B shows CRB hook 55 in a fully extended position (with hook 55 fully grasping handle 22). Once CRB hook 55 grasps handle 22, CRB hook 55 may then slightly pull CRB 20 up and out of FSC 406 (CRB 20 may be pulled out of FSC 406 by approximately ten inches), prior to grapple 400 then fully lifting control rod 400 out of core plate 300. The movement of CRB hook 55, shown in FIGS. 16A/16B, may occur in an identical manner as the movement of the conventional CRB hook 55, shown in FIGS. 5, 6A and 6B.

FIG. 16C/16D are detailed views of a FSC hook of the grapple 200 engaging the FSC 406, in accordance with an example embodiment. FIG. 16C shows FSC hook 80 in a retracted position while FSC hook 80 operates within FSC 406. FIG. 16D shows FSC hook 80 in a fully extended position, as FSC hook 80 grips an edge of side flow orifice 406a of FSC 406. The movement of FSC hook 80, shown in FIGS. 16C/16D, may occur in an identical manner as the movement of the conventional FSC hook 80, shown in FIGS. 4A-4B. Notice that FSC hook 80 only grips the edge of side flow orifice 406a of FSC 406, but the distal end of FSC hook 80 stops short of touching or engaging the CRGT flow orifice 404a.

FIGS. 16E/16F are detailed views of the CRGT hook 202 of the grapple 200 engaging the CRGT 404, in accordance with an example embodiment. FIG. 16E depicts CRGT hook 202 in a full retracted position, where cylinder rod 204b is retracted inside of cylinder cradle 202e (as shown in FIG. 7E). It should be understood that the shape of the tapered portion 202a1, the straight portion 202a2 and the hook portion 202f of the CRGT hook 202 conform to the curved flow channel of the FSC 406 (the channel between an upper flow orifice 406c and a side flow orifice 406a, shown in FIG. 14).

FIG. 16F depicts CRGT hook 202 in a fully extended position, where cylinder rod 204b is fully extended from cylinder cradle 202e (as shown in FIG. 7F). Cylinder rod 204b may be attached to the bottom plate backstop 44c, and the cylinder rod 204b may use the backstop 44c as leverage to force the CRGT hook 202 toward the FSC side flow orifice 406a and CRGT flow orifice 404a. In the fully extended position, the inner landing surface 202c2 is located directly below a lip of the FSC side flow orifice 406a, and outer landing surface 202c1 is located directly below a lip of the CRGT flow orifice 404a. In the fully extended position, the outer landing surface 202c1 also extends slightly beyond the confines of a lip of the control rod guide tube flow orifice 404a (see also, FIG. 16H). The purpose behind the locations of the inner and outer landing surfaces 202c2/202c1 is explained in more detail, in FIG. 16H.

It should be noted that the movement of the CRGT hook 202 (FIGS. 16E-16F), the FSC hook 80 (FIGS. 16C-16D) and the CRB hook 55 (FIGS. 16A-16B) may occur simultaneously, or they may occur one at a time, in any order. That is to say, the movements of hooks 55/80/202 are not tied to each other, meaning that they can operate independently of each other, by extending or retracting independently of any movement of the other hooks. However, in a preferred embodiment, movement of each pair of CRGT hooks 202 occur simultaneously (meaning, the two hooks 202 extend and retract at a same time, and adopt a same position, in unison with each other). Likewise, in a preferred embodiment, movement of each pair of FSC hooks 80 occur simultaneously (meaning, the two hooks 80 extend and retract at a same time, and adopt a same position, in unison with each other).

FIG. 16G is a view of the grapple 200 and the top of control rod 400, after the grapple 200 has grasped the control rod 400, in accordance with an example embodiment. In this figure, FSC hook 80 is in a fully extended position (notice FSC hook 80 contacting the lip of FSC side flow orifice 406a). CRGT hook 202 is also in a fully extended position (notice back-off tab 202d and outer landing surface both extending beyond a lip of FSC side flow orifice 406a). Note that only one CRGT hook 202 and one FSC hook 80 may be seen in this figure. However, in the configuration of FIG. 16G, it should be understood that another CRGT hook 202 and another FSC hook 80 are also in a fully extended position as well, so that the weight of the FSC 406 and CRGT 404 are evenly distributed between both CRGT hooks 202 and FSC hooks 80.

Additionally in FIG. 16G, CRB hook 55 has grasped handle 22 of the control rod blade 20, as shown in FIG. 16B (although the CRB hook 55 and handle 22 can not be seen in this figure). In the configuration, grapple 200 has now fully engaged the control rod blade 200, the FSC 406 and the CRGT 404, and grapple 200 may now lift all three components out of a respective fuel support channel 302 (see the fuel support channel, in FIG. 15B).

As explained in more detail herein, if it is desired that grapple 200 grasp only control rod blade 20 and FSC 406 (and not CRGT 404), then CRGT hook 202 will be locked out by selector switch 201 such that CRGT hook 202 will remain in a retracted position prior to grapple 200 being lifted out of fuel support channel 302.

FIG. 16H is a detailed view of the CRGT hook 202, after the CRGT hook 202 has grasped the CRGT 404, in accordance with an example embodiment. This figure depicts the interaction between the CRGT hook 202, FSC 406, and CRGT 404, once grapple 400 has started to pull the entire control rod 400 out of a respective fuel support channel 302 (see the fuel support channel, in FIG. 15B). Notice inner landing surface 202c2 contacting the lip of FSC side flow orifice 406a. Inner landing surface 202c2 is used to help support FSC 406, in conjunction with the FSC hooks 80. Outer landing surface 202c1 is also contacting the lip of CRGT flow orifice 404a. Outer landing surface 202c1 allows grapple 400 to extract CRGT 404 from fuel support channel 302 along with the control rod blade 20 and FSC 406. Back-off tab 202d, located between the inner and outer landing surfaces 202c2/202c1, may be inserted into a recess in between FSC 406 and CRGT 404 to maintain separation between the FSC 406 and CRGT 404 as the control rod 400 is extracted from fuel support channel 302 by grapple 400.

Figure 17:
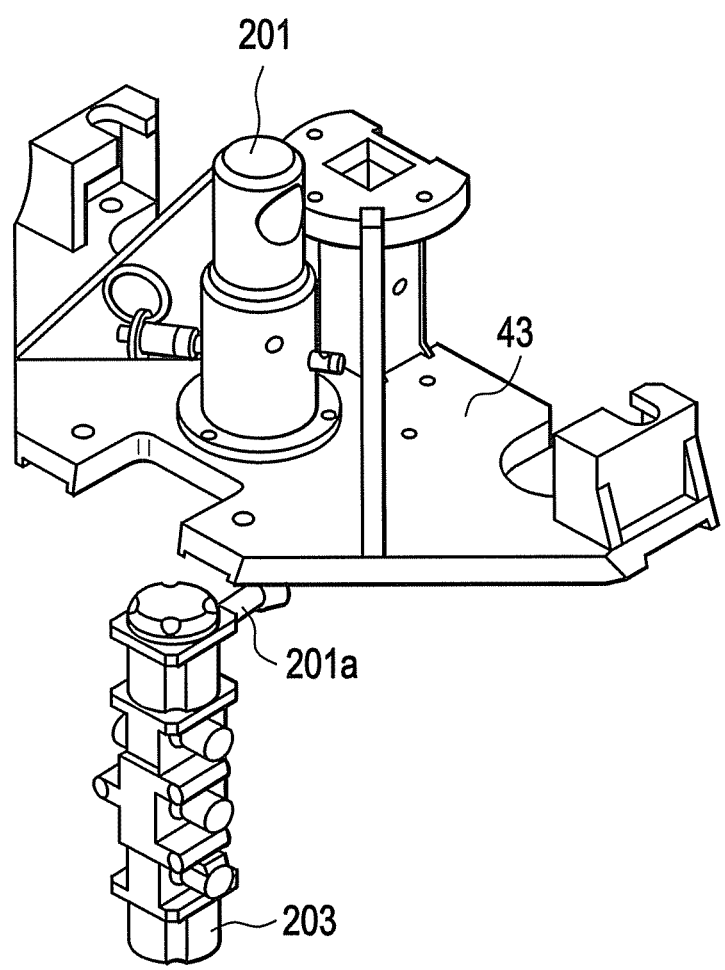
FIG. 17 is a perspective view of a selector switch and 5-way valve, in accordance with an example embodiment.

FIG. 17 is a perspective view of a selector switch 201 and 5-way valve 203, in accordance with an example embodiment. The selector switch 201 and 5-way valve 203 may be mounted anywhere on grapple 400, and may be used to lock out use of the CRGT hooks 202, in the event that only the control rod blade 20 and FSC 406 (and, not CRGT 404) are to be extracted from a fuel support channel 302.

Figure 17A:
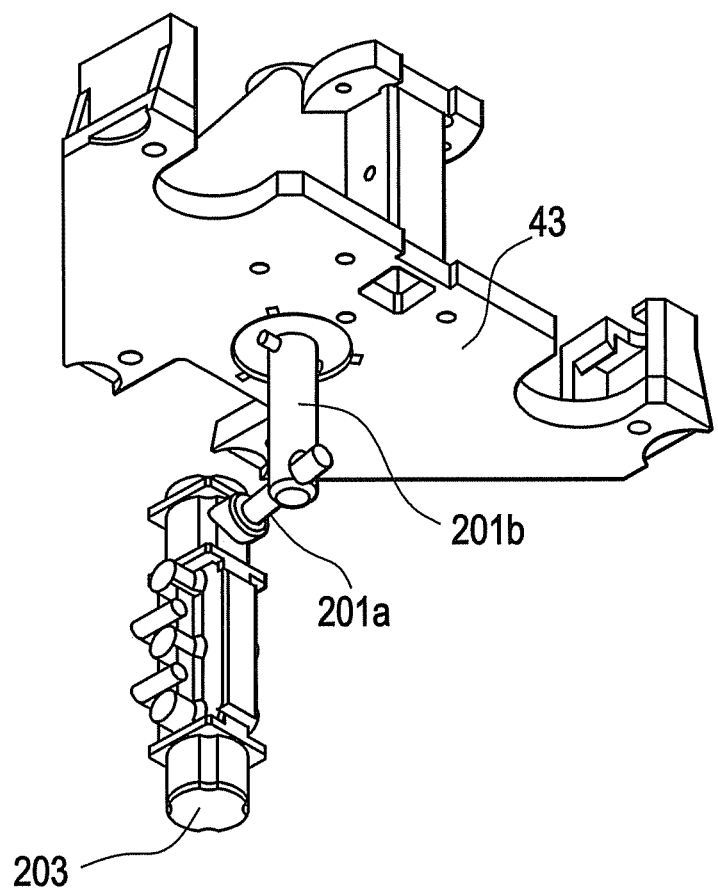
FIG. 17A is an underneath view of the selector switch and 5-way valve of FIG. 17, in accordance with an example embodiment.

FIG. 17A is an underneath view of the selector switch 201 and 5-way valve 203 of FIG. 17, in accordance with an example embodiment. In this embodiment, selector switch 201 is mounted to top plate 43. Selector switch 201 may have a switch stem 201b extending below top plate 43. Toggle 201a inserts into switch stem 201b, allowing toggle 201a to be shifted into one of two positions via an up or down movement of switch stem 201b, as described herein in more detail.

Figure 17D:
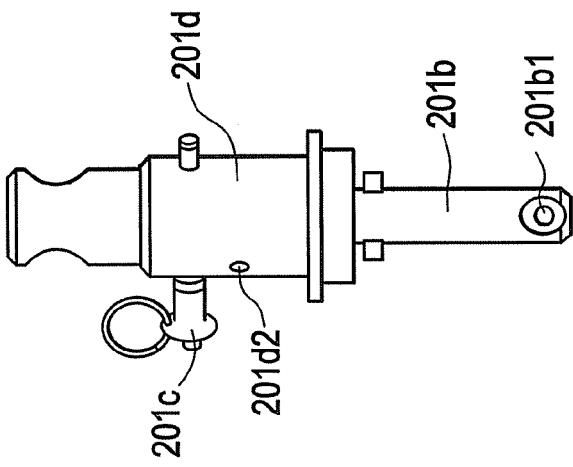
FIG. 17D is a side view of the selector switch of FIG. 17, in accordance with an example embodiment.
Figure 17C:
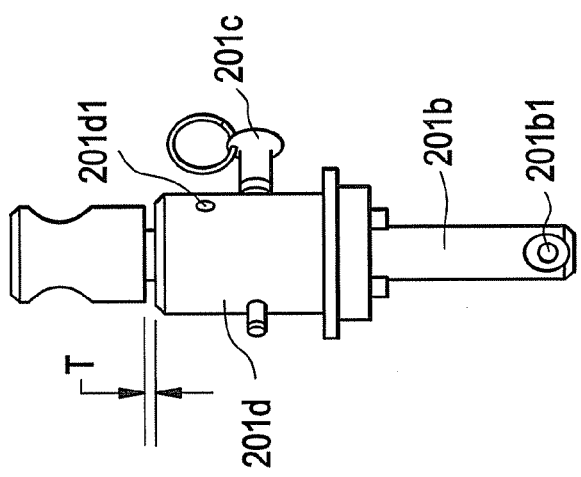
FIG. 17C is a side view of the selector switch of FIG. 17, in accordance with an example embodiment.
Figure 17B:
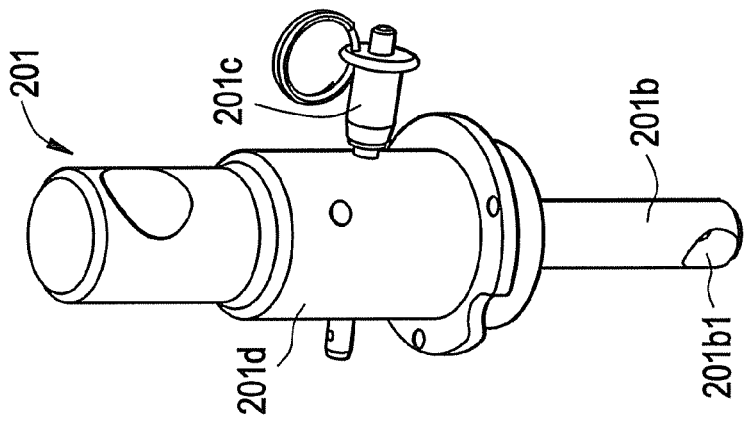
FIG. 17B is a detailed view of the selector switch of FIG. 17, in accordance with an example embodiment.

FIG. 17B is a detailed view of the selector switch 201 of FIG. 17, in accordance with an example embodiment. Selector switch 201 may include a body 201d with a ball lock pin 201 intersecting the body 201d. Switch stem 201b may have a stem through-hole 201b1, allowing toggle 201a to penetrate the switch stem 201b. The crown 201b2 may be connected directly to switch stem 201b.

FIGS. 17C/17D are side views of the selector switch 201 of FIG. 17, in accordance with an example embodiment. FIG. 17C shows the selector switch 201 in a "CRGT Circuit Opened" position, meaning that selector switch 201 is allowing pneumatic control air to reach CRGT hook 202. Ball lock pin 201c is located in the CRGT circuit open pin hole 201d2 of body 201d in this configuration, such that a gap exists between crown 201b2 and the top of body 201d. Because crown 201b2 is directly connected to switch stem 201b, the configuration of FIG. 17C causes toggle 201a to be pulled into an "up" position (see FIG. 17E).

In FIG. 17D, selector switch 201 is a "CRGT Circuit Closed" position. In this configuration, CRGT hook 202 is locked out, such that pneumatic control air is not able to reach CRGT hook 202 to operate the CRGT hooks 202. Notice that crown 201b2 has traveled downward (see travel distance, T, of FIG. 17C), such that no gap exists between crown 201b2 and body 201d. Ball lock pin 201c is now in the CRGT circuit closed pin hole 201d1, causing switch stem 201b and toggle 201a (FIGS. 17A and 17E) to be shifted downward, thereby causing a supply of pneumatic air from 5-way valve 203 to CRGT hooks 202 to be turned off.

Figure 17E:
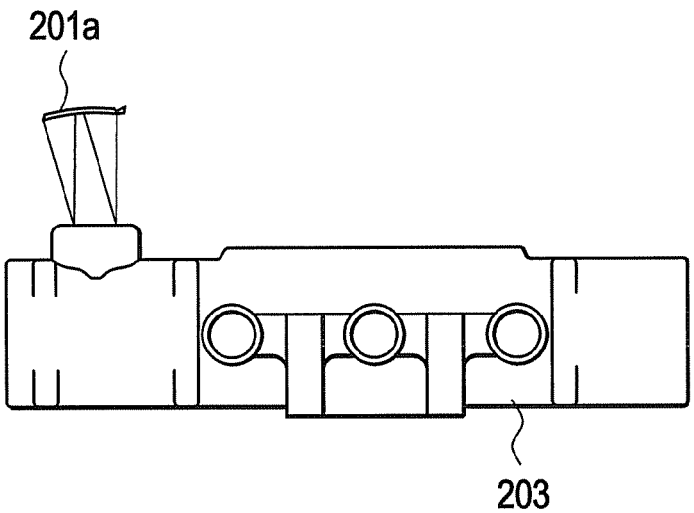
FIG. 17E is a side view of the 5-way valve of FIG. 17, in accordance with an example embodiment.
Figure 17F:
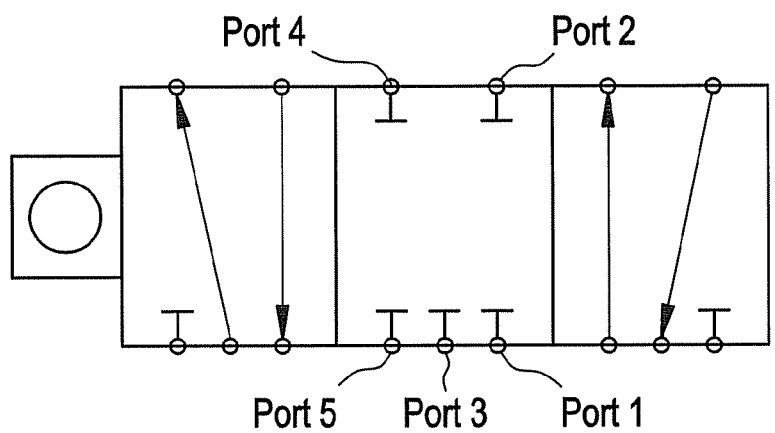
FIG. 17F is a schematic of the 5-way valve of FIG. 17, in accordance with an example embodiment.
Figure 17G:
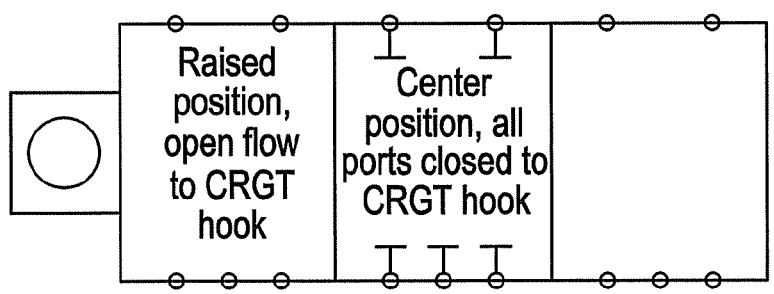
FIG. 17G is another schematic of the 5-way valve of FIG. 17, in accordance with an example embodiment.

FIG. 17E is a side view of the selector switch 201 of FIG. 17, in accordance with an example embodiment. In this figure, toggle 201 is shifted "up" (in a "CRGT Circuit Opened" position, associated with the selector switch 201 configuration of FIG. 17C). In this configuration, pneumatic air from the 5-way valve 203 is supplied to CRGT hooks 202, allowing the CRGT hooks 202 to function.

FIGS. 17E/17F are schematics of the 5-way valve 203 of FIG. 17, in accordance with an example embodiment. The 5-way valve 203 may be used to supply pneumatic air to each of the CRB hook 55, FSC hooks 80 and CRGT hooks 202. For instance, as shown in FIGS. 17E/17F, port 4 may supply air to FSC hooks 80. Port 2 may supply air to CRB hook 55. Ports 1 and 3 may be used to supply air to CRGT hooks 202. Ports 1 and 3 may be closed, via the movement of toggle 201a (as shown in FIGS. 17C-17E), when grapple 200 is being used only to grasp control rod blade 20 and FSC 406, and not grasp CRGT 404.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A grapple for moving a control rod blade, a fuel support casting and a control rod guide tube used in a nuclear reactor core, comprising:
   a frame,
   a control rod blade hook on the frame, the control rod blade hook configured to grasp a handle of the control rod blade,
   a first fuel support casting hook on the frame, the first fuel support casting hook configured to insert into a first side flow orifice of the fuel support casting to grasp the fuel support casting, and
   a first control rod guide tube hook on the frame, the first control rod guide tube hook configured to insert through a second side flow orifice of the fuel support casting and extend beyond a lip of a first guide tube flow orifice,
   the first control rod guide tube hook including,
      a horizontally extending piece on a distal end of the first control rod guide tube hook, the horizontally extending piece including an inner and outer landing surface, the inner and outer landing surfaces being flat, horizontal surfaces that exist in a same horizontal plane.

2. The grapple of claim 1, further comprising:
   a second fuel support casting hook on the frame, the second fuel support casting hook configured to insert into a third side flow orifice of the fuel support casting to grasp the fuel support casting, and
   a second control rod guide tube hook on the frame, the second control rod guide tube hook configured to insert through a fourth side flow orifice of the support casting and extend beyond a lip of a second guide tube flow orifice,
   the first and second control rod guide tube hooks each facing outward, and positioned in opposing locations on the frame.

3. The grapple of claim 1, wherein the first control rod guide tube hook further includes,
   a back-off tab between the inner and outer landing surfaces.

4. The grapple of claim 3, wherein the back-off tab of the first control rod guide tube hook is a triangularly shaped nipple with a longitudinal length that separates the inner and outer landing surfaces.

5. The grapple of claim 3, wherein,
   a length of the inner landing surface of the first control rod guide tube hook is sized to retain a lip of the second side flow orifice of the fuel support casting,
   a length of the outer landing surface of the first control rod guide tube hook is sized to ensure that the outer landing surface extends beyond the lip of the first guide tube flow orifice, and
   a width of the back-off tab of the first control rod guide tube hook is sized to fit between the fuel support casting and the control rod guide tube.

6. The grapple of claim 3, wherein the first control rod guide tube hook further comprises:
   a vertically extending hook body, the hook body including,
      a tapered portion,
      a straight portion connected to the tapered portion, the tapered and straight portions conforming to a shape of a curved flow channel within the fuel support casting, and
   an offset portion, the offset configured to position the inner landing surface below the lip of the second side flow orifice of the fuel support casting, and position the outer landing surface to extend beyond the lip of the first guide tube flow orifice, when the first control rod guide tube hook is in an extended position.

7. The grapple of claim 3, further comprising:
a bottom plate on the frame, and
a through-hole in the bottom plate, the through-hole having a backstop,
the first control rod guide tube hook located inside the through-hole.

8. The grapple of claim 3, wherein the first control rod guide tube hook further comprises:
a cylinder cradle on a top of the first control rod guide tube hook, the cylinder cradle having an aperture on a back surface of the cradle,
a pneumatic cylinder inside the cylinder cradle, and
a cylinder rod extending from the pneumatic cylinder through the aperture and being connected to the backstop,
the pneumatic cylinder configured to extend or retract the cylinder rod, to slide the first control rod guide tube hook into an extended or retracted position, respectively, via the force of pneumatic air.

9. The grapple of claim 8, further comprising:
a 5-way valve on the frame, and
a selector switch configured to open and close ports on the 5-way valve, to turn the pneumatic air to the pneumatic cylinder on or off in order to engage or disengage operation of the first control rod guide tube hook.

10. A system with a grapple grasping a control rod, used in a nuclear reactor core, comprising:
the control rod, including a control rod blade, a fuel support casting and a control rod guide tube,
a frame positioned over the control rod,
a control rod blade hook on the frame, the control rod blade hook grasping a handle of the control rod blade,
a pair of opposing fuel support casting hooks on the frame, the fuel support casting hooks being inserted into respective first and second side flow orifices of the fuel support casting and latched onto a lip of the respective first and second side flow orifices, and
a pair of opposing control rod guide tube hooks on the frame, the control rod guide tube hooks being inserted into respective third and fourth side flow orifices of the fuel support casting and extending beyond a lip of respective first and second guide tube flow orifices,
each of the control rod guide hooks including,
a horizontally extending piece on a distal end of the control rod guide tube hook, the horizontally extending piece including an inner and outer landing surface, the inner and outer landing surfaces being flat, horizontal surfaces that exist in a same horizontal plane.

11. The system of claim 10, wherein each control rod guide tube hook comprises:
a back-off tab between the inner and outer landing surfaces, the back-off tab being a triangularly shaped nipple with a longitudinal length that separates the inner and outer landing surfaces.

12. The system of claim 11, wherein,
a length of the inner landing surface of the control rod guide tube hook is sized to retain the lip of the respective side flow orifice of the fuel support casting,
a length of the outer landing surface of the control rod guide tube hook is sized to ensure that the outer landing surface extends beyond the lip of the respective guide tube flow orifice, and
a width of the back-off tab of the control rod guide tube hook is sized to fit between the fuel support casting and the control rod guide tube.

13. The system of claim 11, wherein each control rod guide tube hook further comprises:
a vertically extending hook body, the hook body including,
a tapered portion,
a straight portion connected to the tapered portion, the tapered and straight portions conforming to a shape of a curved flow channel within the fuel support casting, and
an offset portion, the offset configured to position the inner landing surface below the respective lip of the side flow orifice of the fuel support casting, and position the outer landing surface to extend beyond the respective lip of the guide tube flow orifice.

14. The system of claim 11, further comprising:
a bottom plate on the frame, and
a pair of through-holes in the bottom plate, each through-hole having a backstop,
each control rod guide tube hook located inside one of the respective through-holes.

15. The system of claim 11, wherein each control rod guide tube hook further comprises:
a cylinder cradle on a top of the control rod guide tube hook, the cylinder cradle having an aperture on a back surface of the cradle,
a pneumatic cylinder inside the cylinder cradle, and
a cylinder rod extending from the pneumatic cylinder through the aperture and being connected to the backstop,
the pneumatic cylinder configured to extend or retract the cylinder rod, to slide the control rod guide tube hook into an extended or retracted position, respectively, via the force of pneumatic air.

16. A method of a grapple grasping and lifting a control rod with a control rod blade, a fuel support casting and a control rod guide tube, the method comprising:
lowering a frame of the grapple over the control rod,
actuating a control rod blade hook on the frame to grasp a handle of the control rod blade,
actuating a pair of opposing fuel support casting hooks on the frame, to insert into respective first and second side flow orifices of the fuel support casting and latch onto a lip of the respective first and second side flow orifices,
providing a pair of opposing control rod guide tube hooks on the frame,
providing a horizontally extending piece on a distal end of each control rod guide tube hook, the horizontally extending piece including,
an inner and outer landing surface, the inner and outer landing surfaces being flat, horizontal surfaces,
inserting the control rod guide tube hooks into respective third and fourth side flow orifices of the fuel support casting,
extending a portion of the outer landing surface of the control rod guide tube hooks beyond a lip of respective first and second guide tube flow orifices, and simultaneously lifting the control rod using the control blade hook, the fuel support casting hooks and the control rod guide tube hooks.

17. The method of claim 16, wherein the providing of the control rod guide tube hooks further comprises:
providing a back-off tab between the inner and outer landing surfaces, the back-off tab being a triangularly shaped nipple with a longitudinal length that separates the inner and outer landing surfaces.

18. The method of claim 17, wherein the inserting of the control rod guide tube hooks further comprises:

contacting the inner landing surfaces of the control rod guide tube hooks with a respective lip of the third and fourth side flow orifices, contacting the outer landing surfaces of the control rod guide tube hooks with a respective lip of the first and second guide tube flow orifices, and inserting the back-off tab into a recess between the fuel support casting and the control rod guide tube to maintain a separation between the fuel support casting and the control rod guide tube while in transit.

19. The method of claim 17, wherein the providing of each control rod guide tube hook comprises:

providing a vertically extending hook body for each control rod guide tube hook, the hook body including,
a tapered portion,
a straight portion connected to the tapered portion, and
conforming the shape of the tapered and straight portions to a shape of a curved flow channel within the fuel support casting.

20. The method of claim 17, wherein the providing of each control rod guide tube hook comprises:

inserting the control rod guide tube into a through-hole in a bottom plate of the grapple frame, the through-hole having a backstop, providing a cylinder cradle on a top of the control rod guide tube hook, the cylinder cradle having an aperture on a back surface of the cradle, placing a pneumatic cylinder inside the cylinder cradle, and connecting a cylinder rod to the backstop, the cylinder rod extending through the aperture into the pneumatic cylinder.

21. The method of claim 20, wherein the inserting of the control rod guide tube hooks into the respective third and fourth side flow orifices of the fuel support casting further comprises:

connecting a pneumatic air supply to the pneumatic cylinder, and actuating the pneumatic cylinder with the pneumatic air supply to extend the cylinder rod from the pneumatic cylinder, causing the control rod guide tube hook to insert into the respective third or fourth side flow orifices of the fuel support casting.

22. A grapple for moving a control rod guide tube used in a nuclear reactor core, comprising:

a frame, a pair of control rod guide tube hooks on the frame, each control rod guide tube hook configured to insert through a side flow orifice of the fuel support casting and extend beyond a lip of a guide tube flow orifice, each of the control rod guide tube hooks having a horizontally extending piece on a distal end of the first control rod guide tube hook, the horizontally extending piece including an inner and outer landing surface, the inner and outer landing surfaces being flat, horizontal surfaces that exist in a same horizontal plane.

* * * * *